United States Patent
Shiina et al.

(10) Patent No.: US 8,567,542 B2
(45) Date of Patent: Oct. 29, 2013

(54) INTAKE AIR ROUTING STRUCTURE FOR A VEHICLE, AND VEHICLE INCLUDING SAME

(75) Inventors: Hiromitsu Shiina, Saitama (JP); Yukinori Kurakawa, Saitama (JP); Hiromasa Yamaguchi, Saitama (JP); Ranju Imao, Saitama (JP); Teppei Maeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 13/074,271

(22) Filed: Mar. 29, 2011

(65) Prior Publication Data
US 2011/0240396 A1  Oct. 6, 2011

(30) Foreign Application Priority Data
Mar. 31, 2010  (JP) ................................. 2010-083178

(51) Int. Cl.
*B60K 13/02* (2006.01)

(52) U.S. Cl.
USPC ..................................... 180/68.3; 123/184.21

(58) Field of Classification Search
USPC .............. 180/309, 68.1, 68.2, 68.3, 218, 219, 180/225, 229, 291; 123/184.21
See application file for complete search history.

(56) References Cited

U.S. PATENT DOCUMENTS

| | | | |
|---|---|---|---|
| 5,081,974 A * | 1/1992 | Chikamori et al. | 123/478 |
| 5,596,961 A * | 1/1997 | Faber | 123/184.38 |
| 7,168,516 B2 * | 1/2007 | Nozaki et al. | 180/68.3 |
| 7,237,534 B2 * | 7/2007 | Imamura | 123/470 |
| 7,380,624 B2 * | 6/2008 | Momosaki | 180/68.3 |
| 7,392,784 B2 * | 7/2008 | Yamasaki et al. | 123/198 E |
| 7,418,937 B2 * | 9/2008 | Yokoi | 123/184.53 |
| 7,475,748 B2 * | 1/2009 | Nakamura et al. | 180/68.1 |
| 7,681,551 B2 * | 3/2010 | Konno | 123/400 |
| 8,205,698 B2 * | 6/2012 | Beloy | 180/68.3 |
| 8,210,297 B2 * | 7/2012 | Kalisz et al. | 180/68.2 |
| 8,371,270 B2 * | 2/2013 | Ishii | 123/510 |
| 8,413,758 B2 * | 4/2013 | Shiina et al. | 180/311 |
| 8,439,148 B2 * | 5/2013 | Shiina et al. | 180/312 |
| 2003/0019456 A1 * | 1/2003 | Ayton | 123/184.21 |
| 2004/0050357 A1 * | 3/2004 | Idei et al. | 123/198 E |
| 2004/0173394 A1 * | 9/2004 | Tsuruta et al. | 180/68.1 |
| 2006/0011401 A1 * | 1/2006 | Nakamura et al. | 180/309 |

(Continued)

FOREIGN PATENT DOCUMENTS

JP  2006-044583 A  2/2006

*Primary Examiner* — Katy M Ebner
*Assistant Examiner* — Brodie Follman
(74) *Attorney, Agent, or Firm* — Carrier Blackman & Associates, P.C.; Joseph P. Carrier; William D. Blackman

(57) ABSTRACT

A vehicle intake duct surrounds a high-flow intake passage, which ensures flow capacity and does not spatially restrict other components. The vehicle includes an engine attached to a vehicle body frame, with the intake duct interconnecting an air cleaner and a throttle body, a transmission for sending engine output to wheels, and a seat mounted on an upper longitudinal frame section of the vehicle body frame. The air cleaner is also provided on the upper longitudinal frame section forward of the seat. The intake duct includes a first extending portion descending rearwardly and downwardly from an outlet of the air cleaner and passing laterally of the throttle body, a curved portion extending rearwardly from the first extending portion and toward a center of the vehicle body frame, and a second extending portion wound around toward a rear portion of the throttle body and connected thereto.

19 Claims, 19 Drawing Sheets

(56) References Cited

U.S. PATENT DOCUMENTS

| | | | |
|---|---|---|---|
| 2006/0042603 A1* | 3/2006 | Fukami et al. | 123/472 |
| 2007/0193804 A1* | 8/2007 | Yokoi | 180/219 |
| 2008/0092842 A1* | 4/2008 | Noborio et al. | 123/184.55 |
| 2008/0127914 A1* | 6/2008 | Nakashima et al. | 123/41.65 |
| 2008/0178829 A1* | 7/2008 | Ochiai et al. | 123/90.27 |
| 2008/0236524 A1* | 10/2008 | Maehara et al. | 123/90.12 |
| 2009/0223478 A1* | 9/2009 | Nagao et al. | 123/184.53 |
| 2009/0322069 A1* | 12/2009 | Koike | 280/835 |
| 2010/0078239 A1* | 4/2010 | Beloy | 180/68.3 |
| 2011/0067367 A1* | 3/2011 | Yamamoto et al. | 55/385.3 |
| 2011/0073073 A1* | 3/2011 | Ishii | 123/445 |
| 2011/0073075 A1* | 3/2011 | Ishii | 123/457 |
| 2011/0073079 A1* | 3/2011 | Ishii et al. | 123/509 |
| 2011/0108341 A1* | 5/2011 | Kalisz et al. | 180/68.3 |
| 2011/0108344 A1* | 5/2011 | Bolich et al. | 180/69.4 |
| 2011/0108349 A1* | 5/2011 | McClendon et al. | 180/311 |
| 2011/0155086 A1* | 6/2011 | Matsuda et al. | 123/184.61 |
| 2011/0155492 A1* | 6/2011 | Matsuda et al. | 180/68.3 |
| 2011/0174569 A1* | 7/2011 | Shiina et al. | 180/400 |
| 2011/0214933 A1* | 9/2011 | Kawazumi et al. | 180/291 |
| 2011/0232983 A1* | 9/2011 | Abe et al. | 180/68.3 |
| 2011/0240392 A1* | 10/2011 | Iwata et al. | 180/229 |
| 2011/0240396 A1* | 10/2011 | Shiina et al. | 180/309 |
| 2011/0240397 A1* | 10/2011 | Shiina et al. | 180/312 |
| 2012/0240903 A1* | 9/2012 | Kondo et al. | 123/518 |
| 2012/0274057 A1* | 11/2012 | Kanai | 280/835 |
| 2013/0081895 A1* | 4/2013 | Nomura et al. | 180/220 |

* cited by examiner

INTAKE AIR ROUTING STRUCTURE FOR A VEHICLE, AND VEHICLE INCLUDING SAME

CROSS-REFERENCE TO RELATED APPLICATIONS

The present invention claims priority under 35 USC 119 based on Japanese patent application No. 2010-083178, filed on Mar. 31, 2010. The subject matter of this priority document is incorporated by reference herein.

BACKGROUND OF THE INVENTION

1. Field of The Invention

The invention relates to a saddle-type vehicle and, more particularly, to a vehicle in which an intake system of an internal combustion engine is improved.

2. Description of the Background Art

In the past, as a saddle-type vehicle suitable for rough terrain traveling, a known all-terrain vehicle (ATV) has a structure which is equipped with relatively large diameter, low-pressure balloon tires at front and rear portions of a vehicle body configured to be relatively small and light-weight. In this type of known vehicle, as shown in, for example, a Patent Literature 1, the vehicle body is configured such that a vehicle body frame that is a framework of the vehicle body is formed in a loop structure by using several types of steel members such as pipes, etc., and the steel members are joined to one another by a plurality of cross members whereby a box structure which is elongated in a forward/rearward direction at a center in the left and right direction of the vehicle body is formed. With resort to this structure, an engine, a power transmission for transmitting engine drive force, etc. are arranged and an intake system is configured in such a manner to be positioned on an upward side of the vehicle body frame so as to be suited for the rough terrain traveling.

[Patent Literature 1] JP2006-44583

In the vehicle shown in the Patent Literature 1, a structure in which, due to vehicle characteristics, an air cleaner is arranged at an upper portion close to a forward portion of the vehicle body is provided. The air cleaner is required to ensure a predetermined capacity and, in addition to this, an intake passage, a throttle body, and a connecting tube are arranged below the air cleaner, so that a vehicle height is increased. Particularly, if high intake-capacity is needed, there is a problem that the position of center of gravity is raised due to the increased vehicle height.

The present invention has been made in view of the problems with the known art, and it is an object of the present invention to provide a vehicle with an intake passage which ensures good intake capacity of an air cleaner and associated ducting.

It is another object of the present invention to provide a vehicle of the type described, which does not overly spatially restrict other components of the vehicle.

SUMMARY OF THE INVENTION

In order to achieve the above-mentioned objects, the invention as defined in a first aspect hereof is characterized by a vehicle including an internal combustion engine whose cylinder extends upward from a crankcase at a center of a vehicle body frame, an exhaust pipe connected to a forward portion of the cylinder of the internal combustion engine, an intake passage connected, via a throttle body, to a rearward portion of the cylinder of the internal combustion engine, an air cleaner attached to the vehicle body frame, a power transmission for transmitting output generated in the internal combustion engine to wheels, and a seat provided on the vehicle body frame, wherein the air cleaner is provided on the vehicle body frame in the front of the seat, and the intake passage is configured to include a first extending portion arranged so as to descendingly extend in a vehicle body rearward direction from an outlet of the air cleaner and pass laterally of the throttle body, a curved portion curved inward of a vehicle body at a rear end of the first extending portion, and a second extending portion connected to the throttle body from a rearward direction so as to be wound around toward a rearward direction of the throttle body.

The invention as defined in a second aspect hereof is characterized in that, in addition to the constitution defined in the first aspect, the first extending portion is configured such that a side thereof in a vehicle body rearward direction has a cross-sectional area of an air flow path which is larger than that of a side thereof in a vehicle body forward direction.

The invention as defined in a third aspect hereof is characterized in that, in addition to the constitution defined in the first or second aspect hereof, the curved portion and the second extending portion are configured such that they have cross-sectional areas of air flow paths which are larger than the first extending portion.

The invention according to a fourth aspect hereof is characterized in that, in addition to the constitution defined in any one of the first through third aspects hereof, the second extending portion is provided with a gradually narrowed region in which a cross-sectional area of an air flow path is gradually reduced toward a downstream of the flow path.

The invention as defined in a fifth aspect hereof is characterized in that, in addition to the constitution defined in any of the first through fourth aspects hereof, the second extending portion is provided with a bulged portion which is bulged on a side opposite to an air inflow side relative to a connection portion with respect to the throttle body, and an intake temperature sensor is provided at the bulged portion.

The invention as defined in a sixth aspect hereof is characterized in that, in addition to the constitution defined in any of the first through fifth aspects hereof, an upper longitudinal frame section which extends in a forward/rearward direction on a substantially center in a vehicle width direction is provided at an upper portion of the vehicle body frame, the air cleaner has a downwardly bulged portion at a position which is more forward than the cylinder of the internal combustion engine in the vehicle forward direction and at which it is overlapped on the upper longitudinal frame section when viewed in a side view, and is attached to the position, the first extending portion passes laterally of the upper longitudinal frame section, and the second extending portion passes under the upper longitudinal frame section.

The invention as defined in a seventh aspect hereof is characterized in that, in addition to the constitution defined in any of the first through sixth aspects hereof, the exhaust pipe is arranged on a side opposite to the first extending portion, with the upper longitudinal frame section interposed therebetween.

ADVANTAGEOUS OF THE INVENTIVE EMBODIMENTS

According to the invention defined in the first aspect hereof, the intake passage of the air cleaner which is arranged at a high position of the top surface of the vehicle is arranged so as to be wound around toward the side of the throttle body, whereby a space between the throttle body and an upper vehicle body frame can be reduced, and the position of the seat arranged on the vehicle body frame can be set so as to be lowered. Consequently, it is possible to provide a vehicle in which the position of center of gravity of the vehicle is lowered.

According to the invention defined in the second aspect hereof, in addition to the effect of the first aspect, it is possible to reduce air resistance which is involved in the turbulence of the air flow path toward the curved portion connected to the second extending portion, since the first extending portion is configured such that the side thereof in the vehicle body rearward direction has the cross-sectional area of the air flow path which is larger than that of the side thereof in the vehicle body forward direction.

According to the invention defined in the third aspect hereof, in addition of the effect of the first or second aspect, it is possible to reduce the air resistance and allow an air stream to be smoothly flow, since the air flow path which is largely curved from the first extending portion to the second extending portion is provided and the cross-sectional area of the flow path extending from the curved portion to the second extending portion is configured so as to be increased. Therefore, the intake passage is allowed to be curved rearward from the side of the throttle body with a sharp curve, and it is possible to provide an intake passage which allows a vehicle inside space to be used, regardless of the positions of the air cleaner and the throttle body.

According to the invention defined in the fourth aspect hereof, in addition to the effects of the first through third aspects hereof, it is possible to increase an air density toward the throttle body, since the second extending portion is provided with the gradually narrowed region in which the cross-sectional area of the air flow path is gradually reduced toward the downstream of the flow path.

According to the invention defined in the fifth aspect hereof, in addition to the effects of the first through fourth aspects hereof, it is possible to accurately measure the temperature of the intake air, since the intake temperature sensor is attached to the position at which the influence of the intake flow is reduced at the bulged portion against which the intake flow is not struck directly.

According to the invention defined in the sixth aspect hereof, in addition to the effects of the first through fifth aspects hereof, it is possible to compactly arrange the air cleaner, while ensuring the intake capacity of the air cleaner arranged at the high position of the top surface of the vehicle, set the position of the seat arranged on the upper longitudinal frame section, so as to lower the position, and lower the position of center of gravity of the vehicle.

According to the invention defined in the seventh aspect hereof, in addition to the effects of the first through sixth aspects hereof, it is possible to make the vehicle body compact without any necessity to leave a useless space, lower a seat height and compact the vehicle width, since an intake system composed of the air cleaner and the intake passage, and an exhaust system are arranged on the left and right sides while the upper longitudinal frame section is interposed therebetween.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
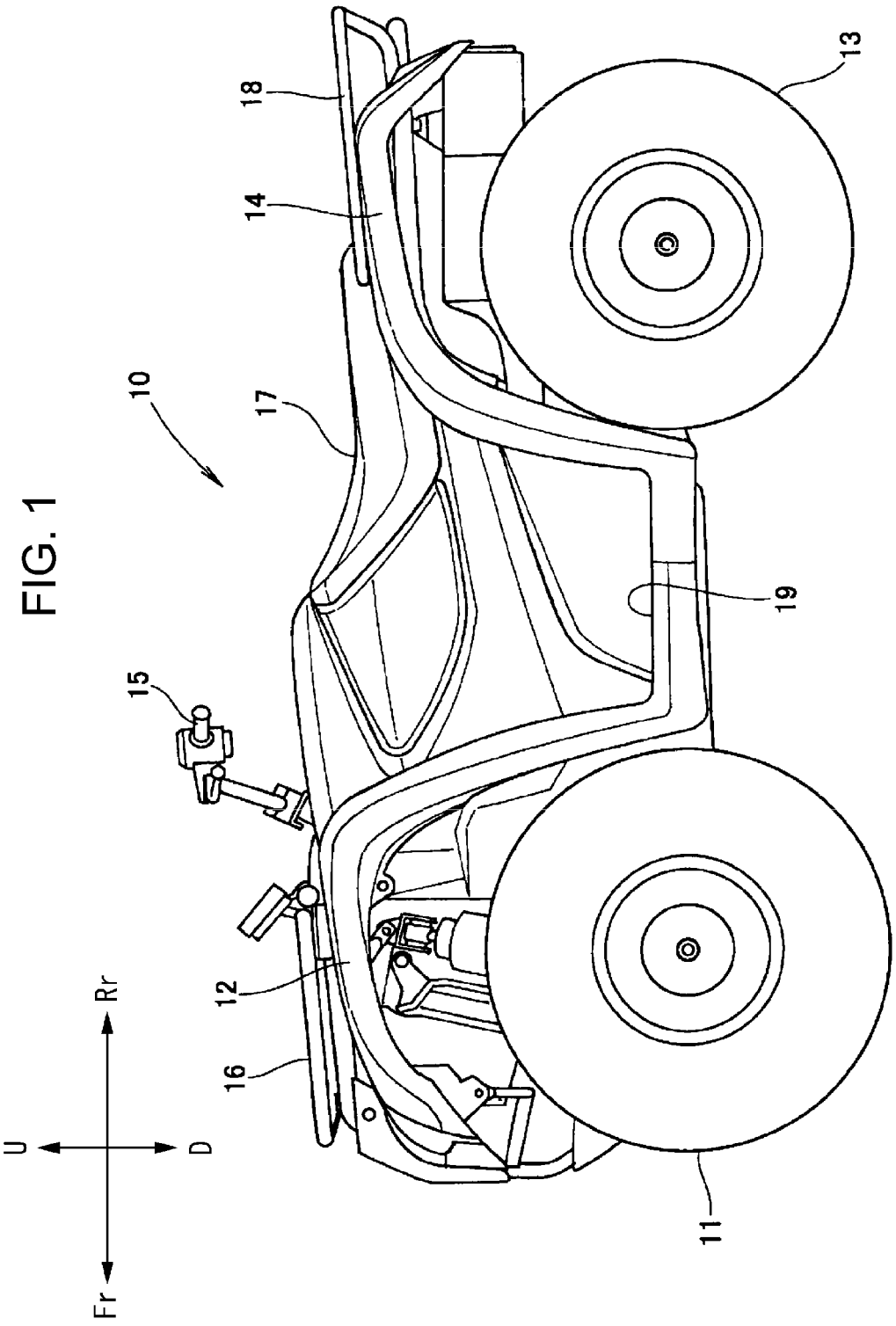
FIG. 1 is a left side plan view of a vehicle.

An embodiment of the present invention will be explained below on the basis of the drawing FIGS. 1 to 19. Incidentally, left, right, upper, down, etc. shall be referred to while viewing the drawings according to the orientation of reference signs. Also, forward/rearward, left/right, and upward/downward directions of a vehicle shall be referred to according to a direction viewed from a rider. In the drawings, the front (forward) direction of the vehicle is indicated by FR, the rearward direction of the vehicle is indicated by RR, the left direction of the vehicle is indicated by L, the right direction of the vehicle is indicated by R, the upward direction of the vehicle is indicated by U, and the downward direction of the vehicle is indicated by D.

An illustrative embodiment of the invention, applied to an all-terrain vehicle (ATV) that is a saddle-type, rough terrain traveling vehicle will be explained below.

As shown in FIG. 1, the vehicle 10 in this embodiment, when viewed from its side, is provided with a front wheel 11 at a lower portion of a front portion of a vehicle body, is provided with a front fender 12 above the front wheel 11, is provided with a rear wheel 13 at a lower rear portion of the vehicle body, and is provided with a rear fender 14 above the rear wheel 13.

The vehicle 10 is also provided with a steering handlebar 15 above the front wheel 11, a front cargo bed 16 in the front of the steering handlebar 15, and a seat 17 and a rear cargo bed 18, both located behind the steering handlebar 15.

Figure 2:
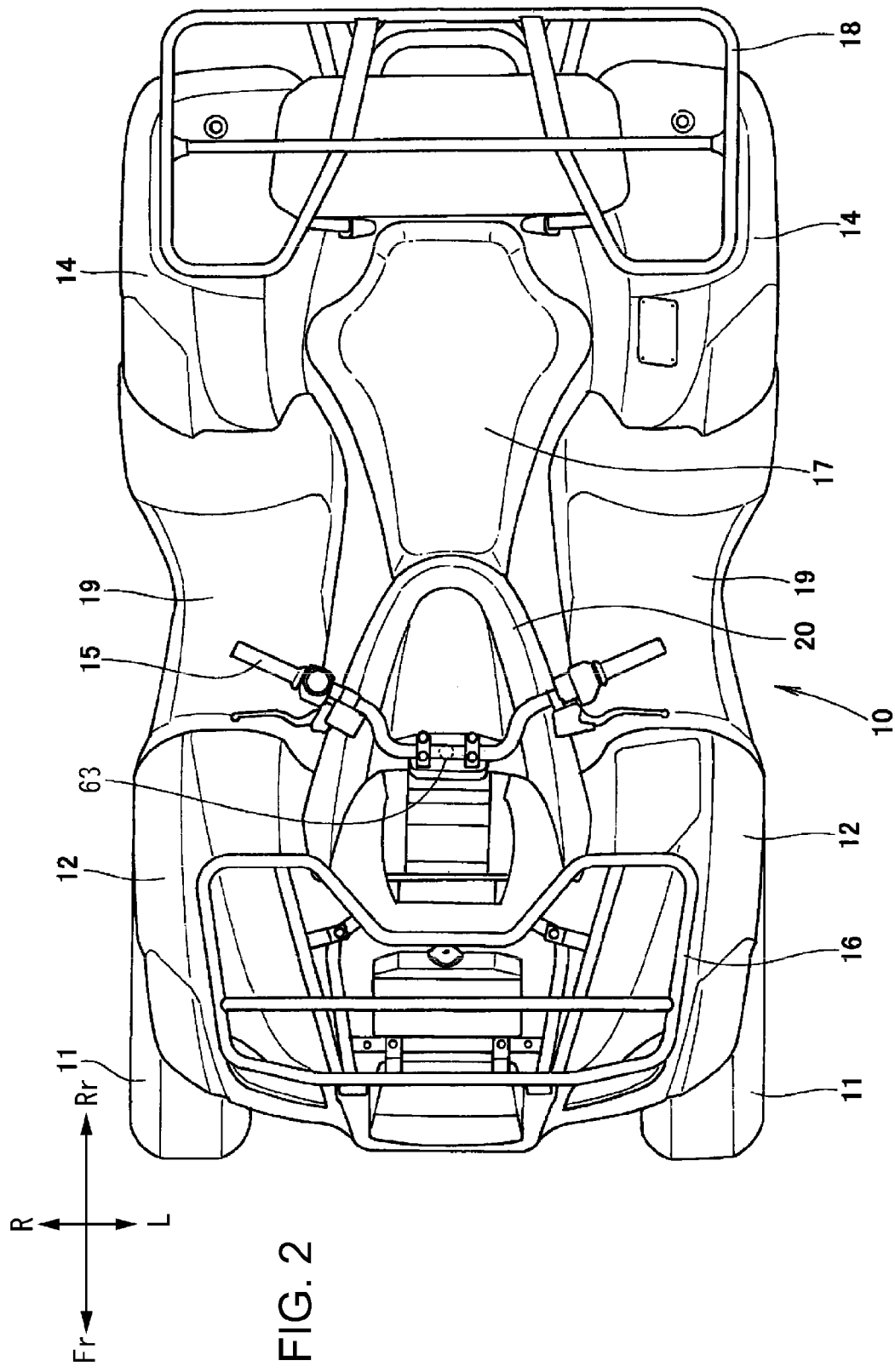
FIG. 2 is a top plan view of the vehicle.

As shown in FIG. 2, the vehicle 10 when viewed from above, is provided with left and right running boards 19, 19 between the steering handlebar 15 and the seat 17, and is configured as a vehicle for saddle-riding in which the rider/operator sitting on the seat 17 can put his or her feet on the running boards 19, 19.

Moreover, the vehicle 10 is provided with a front cover 20 that is arranged between a steering shaft 63 and the seat 17 and covers an air cleaner element 23 (refer to FIG. 3) which will be discussed below.

Figure 3:
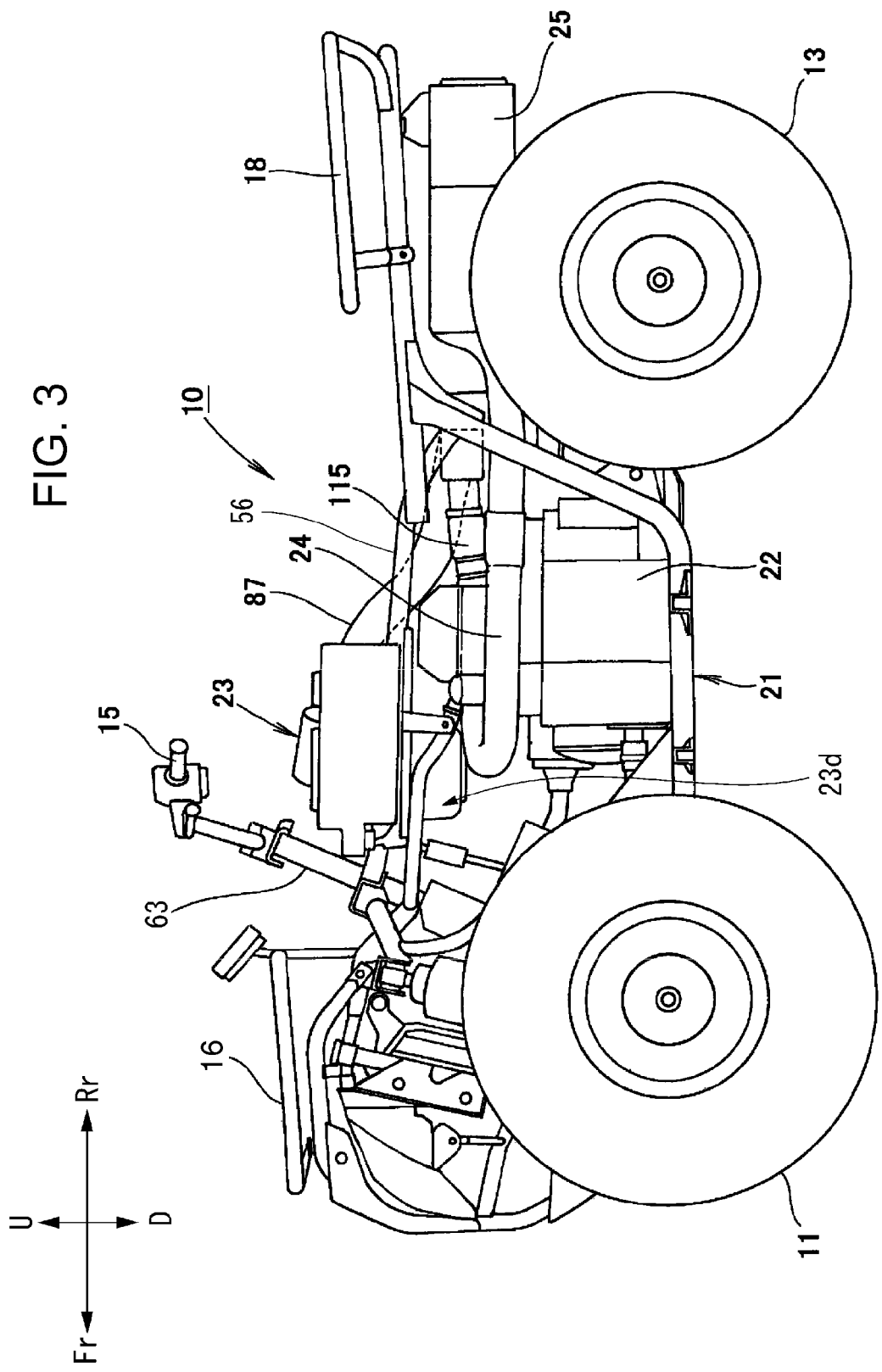
FIG. 3 is a left side view of the vehicle with a vehicle body cover being removed therefrom.

As the vehicle with a vehicle body cover removed therefrom is shown in FIG. 3, the vehicle 10 is provided with an internal combustion engine 22 such as a gasoline engine, diesel engine, natural gas-powered engine, alcohol/gasoline engine or the like, where the engine 22 is operatively mounted at a center of a vehicle body frame 21.

The air cleaner element 23 is operatively attached to an upper longitudinal frame section 56 of the vehicle body frame 21. Air which is received into the air cleaner element 23 is led, via an main intake duct 87, into a throttle body 115, and is there mixed with fuel to be burned by the internal combustion engine 22. After the fuel has been burned, exhaust gas is discharged outwardly from the internal combustion engine 22 through an exhaust pipe 24 extending therefrom, and a muffler 25 connected to a rear end of the exhaust pipe 24.

Power obtained in the internal combustion engine 22 is transmitted to the front wheel 11 and/or the rear wheel 13, where each of these wheels is rotatably attached to a lower portion of the vehicle body frame 21, respectively.

Therefore, it is possible to steer the wheels by turning the steering handlebar 15 to pivotally move the steering shaft 63, where the steering shaft 63 is pivotally attached to an upper front portion of the vehicle body frame 21.

If the front and rear wheels 11, 13 are equipped with special wide, low-pressure tires which are called balloon tires, convex and concave road surfaces are effectively smoothed out by appropriate deformation of the low-pressure tires and, even if the road surface is soft, sinking can be inhibited by the wide tires, so that this vehicle 10 has the structure suitable for use as an all-terrain vehicle.

Figure 4:
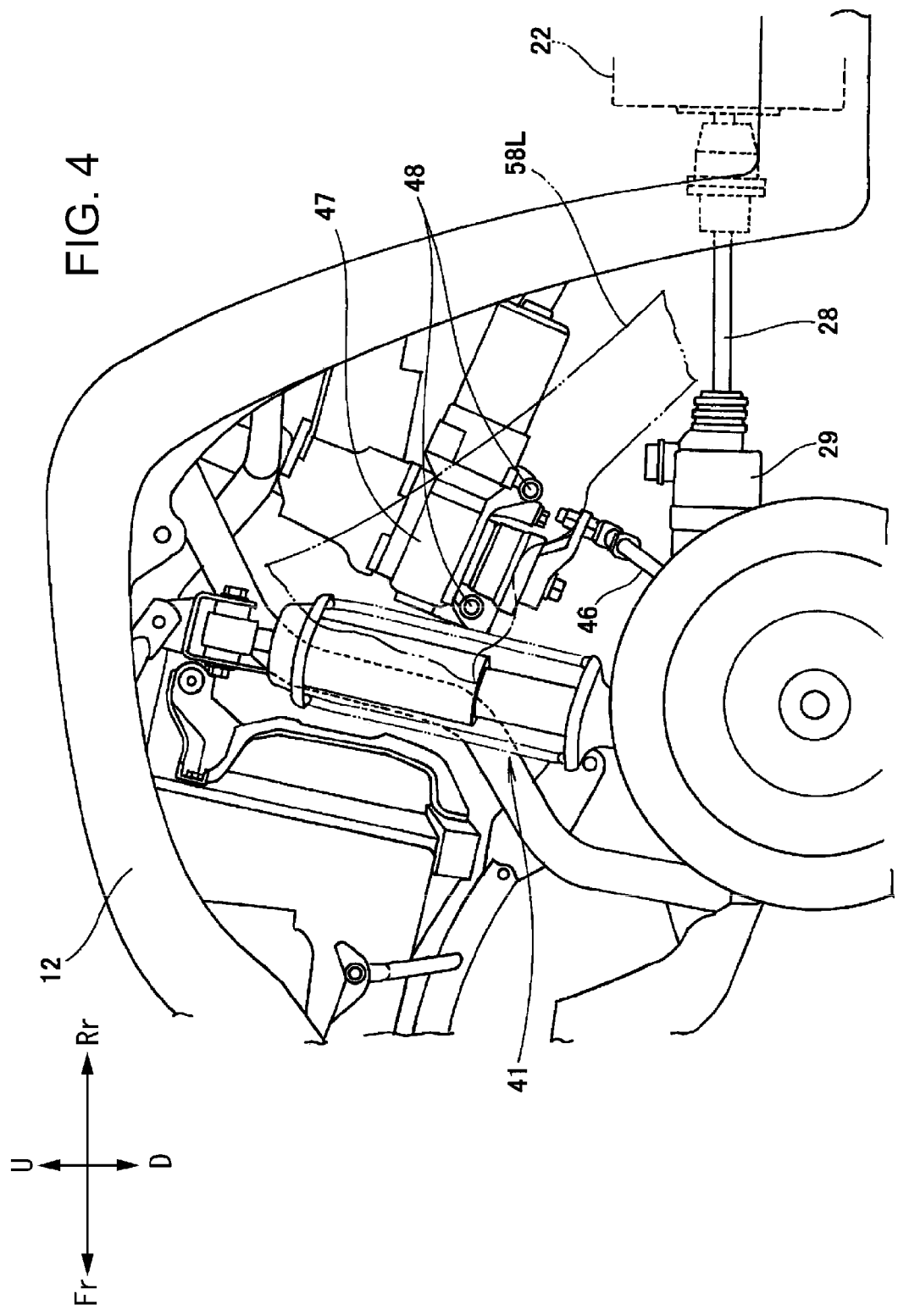
FIG. 4 is a side view for explaining a suspension system for a front wheel.

Incidentally, power generated by the internal combustion engine 22 is transmitted to a final reduction gear 29 by a power transmission apparatus such as a propeller shaft 28 or the like, as shown in FIG. 4.

Figure 5:
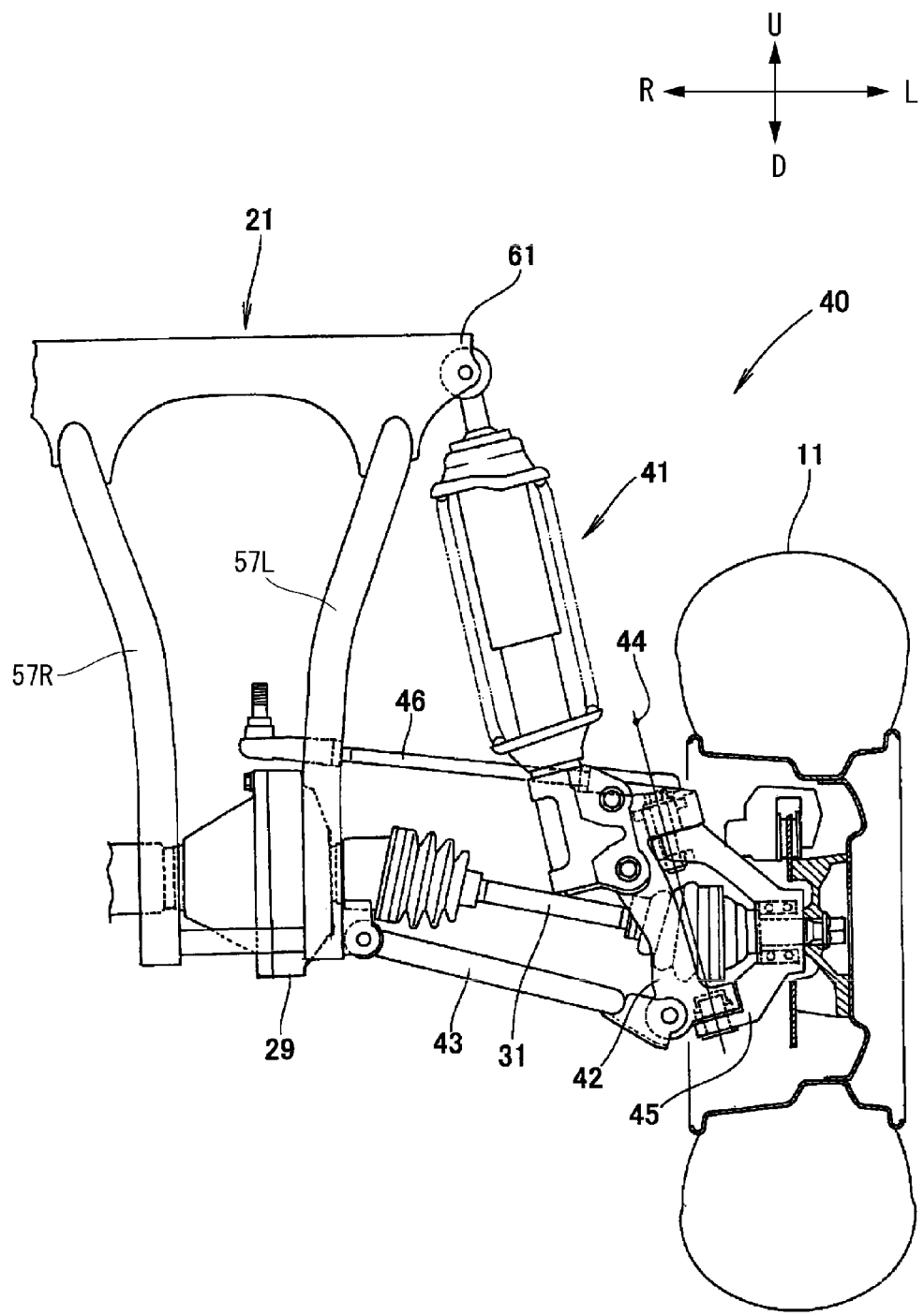
FIG. 5 is a front view for explaining the suspension system for the front wheel.

As shown in FIG. 5, the power is then transmitted to the front wheel 11 through a drive shaft 31 which extends in a vehicle width direction from the final reduction gear 29, and in this way, the front wheel 11 is rotatably driven.

As shown in FIG. 5, a front suspension system 40 includes a front shock absorber 41, connected at an upper end thereof to the vehicle body frame 21, and extending downwardly to a lower support bracket at a lower end thereof. The front suspension system 40 also includes a knuckle-supporting member 42 extending downwardly from a lower portion of the front shock absorber 41, and a lower suspension arm 43 extending in the vehicle width direction and linking a lower portion of the knuckle-supporting member 42 to the vehicle body frame 21. The front suspension system 40 also includes a knuckle 45, rotatably attached around a kingpin shaft 44 with respect to the knuckle-supporting member 42 and supporting the front wheel 11 thereon, and a tie rod 46 extending in the vehicle width direction and operable to pivotally move the knuckle 45 around the kingpin shaft 44.

As shown in FIG. 4, the tie rod 46 is linked to an output shaft of a power steering unit 47. The power steering unit 47 is fastened by bolts 48, 48 to a front tension bracket 58L which is shown in phantom outline in the drawing.

Figure 6:
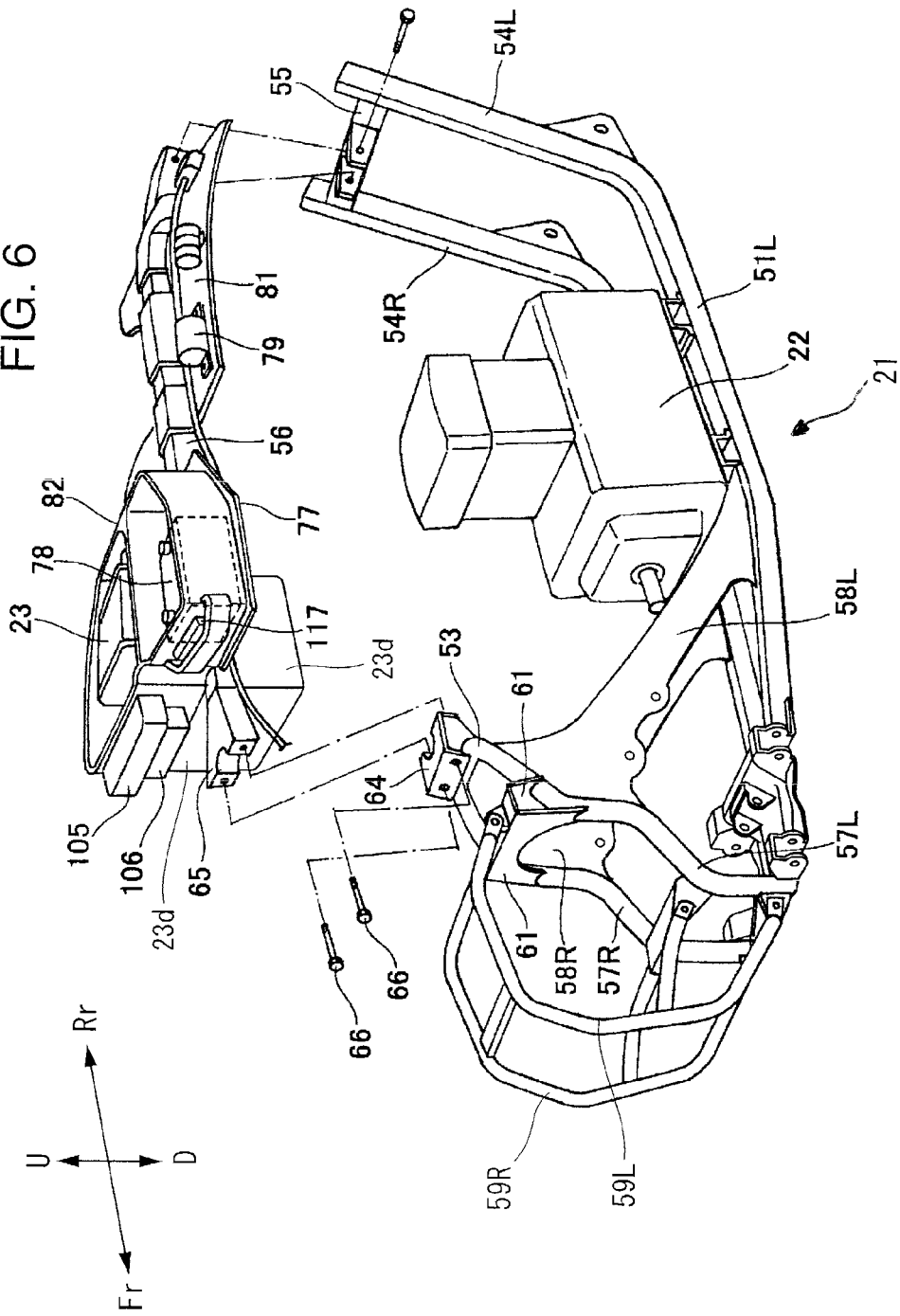
FIG. 6 is an exploded perspective view of a vehicle body frame.

In the vehicle body frame 21, as shown in FIG. 6, the upper longitudinal frame section 56 can be removed from a main lower portion of the frame by disconnecting the upper longitudinal frame section and the main lower portion at a first support bracket 53 and a second support bracket 55. Thus, when an in-vehicle component such as the internal combustion engine 22, etc. is to be mounted to the vehicle body frame, if the upper longitudinal frame section 56 is removed, it is possible to lower the in-vehicle component, which is a heavy component, into the vehicle body frame 21 from above, which facilitates installation thereof.

Moreover, an auxiliary component-supporting portion 77, for supporting auxiliary components such as the air cleaner element 23, a battery 78, etc., and an electrical component support member 81, for supporting electrical components thereon such as an ignition coil 79, etc., are respectively attached to the upper longitudinal frame section 56. By collective arrangement of the auxiliary components, the electrical components, etc., prior sub-assembling is made possible. Moreover, by removing the upper longitudinal frame section 56, it is possible to remove the attached auxiliary components and electrical components, etc. together from the vehicle body frame 21, and maintenance and inspection thereof are easily performed.

The structure of the vehicle body frame 21 will now be explained in detail.

Figure 7:
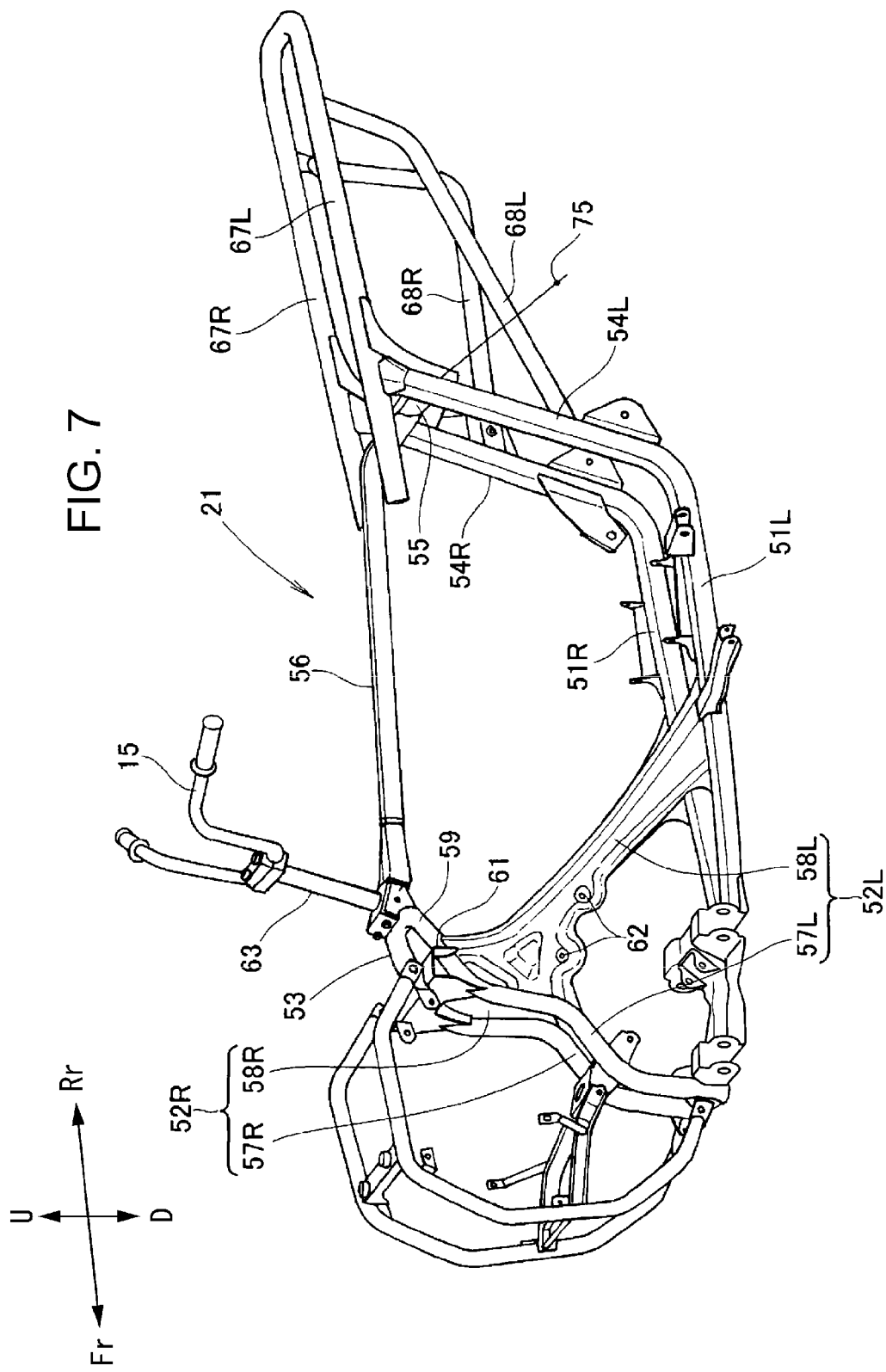
FIG. 7 is a perspective view of the vehicle body frame.

As shown in FIG. 7, the vehicle body frame 21 has a structure which includes, as main elements, a pair of left and right main frame sections 51L, 51R which pass under the internal combustion engine 22 in the forward/rearward direction of the vehicle (refer to FIG. 6), and are bent upwardly at rear portions thereof. The vehicle body frame 21 also includes left and right front wheel-suspension supporting portions 52L, 52R (refer to FIG. 7) which are formed of pipes or frame sections extending upwardly from front portions of the main frame sections 51L, 51R and support the front wheel suspension system 40 (refer to FIG. 5), the first support bracket 53 bridged from the left front-wheel-suspension supporting portion 52L to the right front-wheel-suspension-supporting portion 52R in the vehicle width direction, the second support bracket 55 bridged from a curved portion 54L of a rear portion of the left main frame section 51L to a curved portion 54R of a rear portion of the right main frame section 51R in the vehicle width direction, and the upper longitudinal frame section 56 passing in the forward/rearward direction of the vehicle above the internal combustion engine 22, removably attached at a front end thereof to the first support bracket 53, and removably attached at a rear end thereof to the second support bracket 55.

The upper longitudinal frame section 56 is bending-formed in such a manner that a rear portion thereof faces downward and becomes oblique. Moreover, the front wheel suspension supporting portion 52L includes a front pipe portion 57L extending upward from the main frame section 51L, and a front tension bracket portion 58L obliquely bridged across the upper portion of the front pipe portion 57L and the main frame section 51L and reinforcing the front pipe portion 57L. The front wheel suspension supporting portion 52R also includes a front pipe portion 57R and a front tension bracket portion 58R.

Bolt holes 62, 62 which are used at the time of fastening a power steering unit 47 (refer to FIG. 4) to the front tension bracket portion 58L are formed in the front tension bracket portion 58L. The front wheel suspension supporting portion 52R is also formed with similar bolt holes 62, 62 and forms a structure for supporting the power steering unit 47.

The pair of left and right front pipe portions 57L, 57R are interconnected at upper ends thereof by the first support bracket 53, the first support bracket 53 is formed of a U-shaped pipe portion 59 which opens downward as viewed from the vehicle forward direction, the U-shaped pipe portion 59 is continued to the left and right front pipe portions 57L, 57R, and the left and right front pipe portions 57L, 57R and the U-shaped pipe portion 59 are formed of a single bent pipe.

The left and right front pipe portions 57L, 57R and the U-shaped pipe portion 59 are formed of the single bent pipe, whereby the number of the components of the front wheel suspension supporting portions 52L, 52R can be reduced. To the forward sides of the front pipe portions 57L, 57R, front sub-pipes 59L, 59R are attached.

Moreover, at the front pipe portions 57L, 57R, front shock-attaching portions 61, 61 to which the front shock absorber 41 (refer to FIG. 5) is attached are provided.

The front shock-attaching portions 61 are provided in the neighborhood of the first support bracket 53, whereby force from the front shock absorber 41 is smoothly transmitted to the vehicle body frame 21 through the first support bracket 53.

Moreover, the steering shaft 63 which extends downward from the steering handlebar 15 is supported movably by a front side steering shaft bearing portion 64 and a rear side steering bearing portion 65 which are shown in FIG. 6. The front side steering shaft bearing portion 64 is provided at the first support bracket 53, and the rear side steering shaft bearing portion 65 is provided at the tip end of the upper longitudinal frame section 56.

The rear side steering shaft bearing portion 65 is aligned with the front side steering shaft bearing portion 64 in the forward/rearward direction of the vehicle and joined to it by bolts 66, 66, whereby a bearing structure is configured.

Namely, by skillfully utilizing the first support bracket 53 and the tip end of the upper longitudinal frame section 56, the steering shaft 63 (refer to FIG. 7) can be easily supported with the low number of parts.

Moreover, as shown in FIG. 7, rear pipes 67L, 67R extend in the rearward direction of the vehicle from the upper ends of the curved portions 54L, 54R of the left and right main frame sections 51L, 51R. The rear pipes 67L, 67R are reinforced by rear sub-pipes 68L, 68R which are extended from centers of the curved portions 54L, 54R in a height direction of the curved portions 54L, 54R. The tip ends of the rear pipes 67L, 67R, when viewed in the side view of the vehicle, are extended in the forward direction of the vehicle from the rear end of the upper longitudinal frame section 56. Namely, the tip ends of the rear pipes 67L, 67R, when viewed in the side view of the vehicle, are overlapped on the rear end of the upper longitudinal frame section 56.

Figure 8:
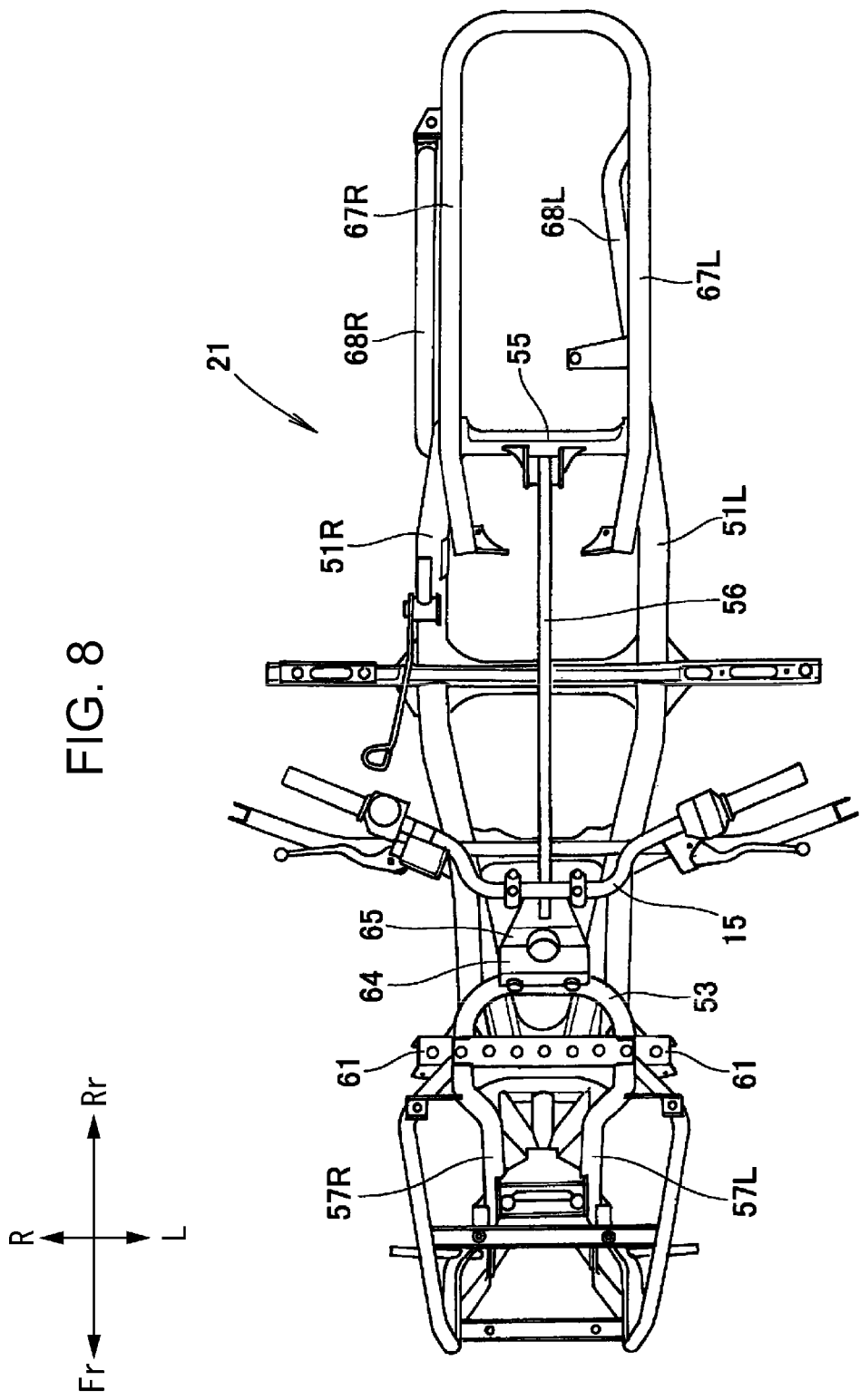
FIG. 8 is a top plan view of the vehicle body frame.

As shown in FIG. 8 which is the top plan view of the vehicle body frame 21, the single upper longitudinal frame section 56 is provided on a center line of the vehicle body. While two left and right upper longitudinal frame sections 56 may be bridged across the first support bracket 53 and the second support bracket 55, in the case of the single upper longitudinal frame section, the weight-reduction of the vehicle body frame 21 is made possible, easy attachment and detachment are allowed, and the time of the work of assembling, etc. is reduced.

Figure 9:
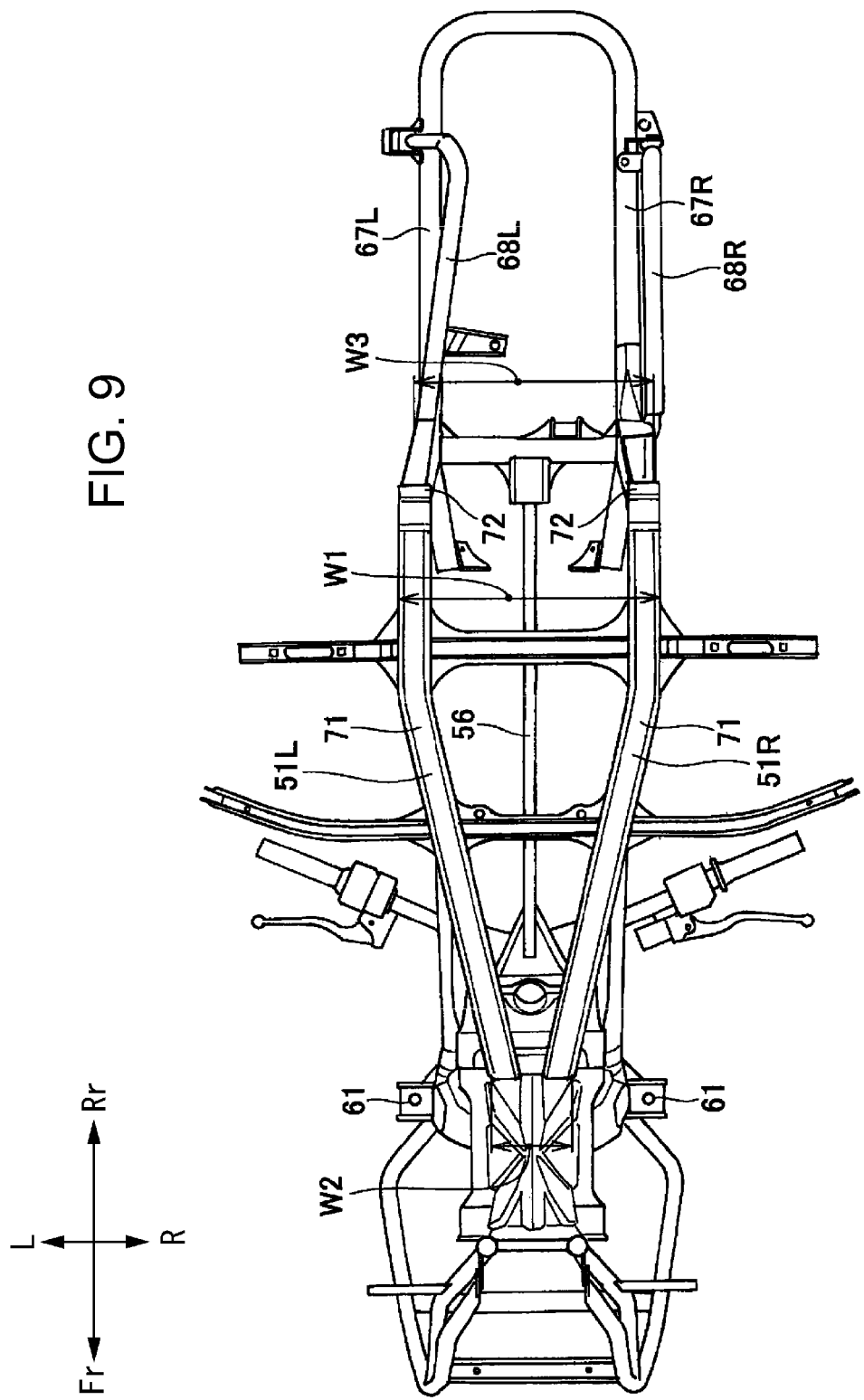
FIG. 9 is a bottom view of the vehicle body frame.

Moreover, as shown in FIG. 9, which is a bottom plan view of the vehicle body frame 21 (the accompanying letters L and R become reversed), a front bent portion 71 and a rear bent portion 72 are provided at the left and right main frame sections 51L, 51R in such a manner that, regarding an interval (outer width) between the left and right main frame sections 51L, 51R in the vehicle width, a center portion has a first width W1, whereas a front interval and a rear interval become narrower so as to be W2 (W2<W1) and W3 (W3<W1), respectively.

The front interval is made narrower, whereby adjustment of alignment is made easy, and the rear interval is made narrower, whereby riding habitability is easily ensured in the saddle-type vehicle.

Next, a manner of attaching a rear shock absorber will be explained.

Figure 10:
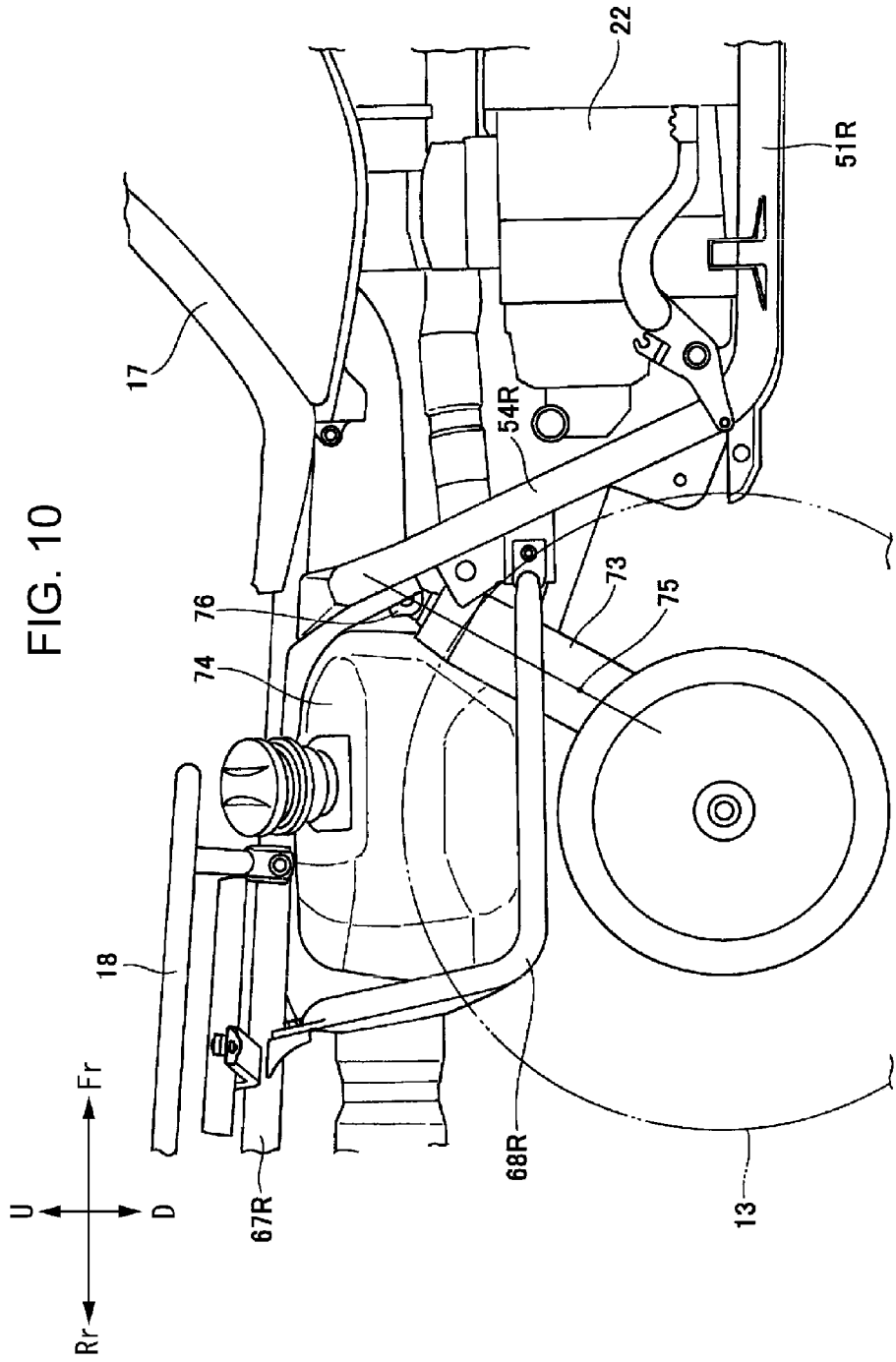
FIG. 10 is a right side view of a vehicle rear portion.

As shown in FIG. 10, the rear shock absorber 73 is attached at an upper portion thereof to a rear shock-attaching portion 76. This rear shock-attaching portion 76 is provided at the second support bracket 55 (refer also to FIG. 9).

Such a rear shock absorber 73 is obliquely arranged in such a manner that a lower portion thereof is positioned in the vehicle rearward direction (in the Figure, the right is the vehicle forward direction) relative to the upper portion thereof so as to allow the rear shock absorber to pass in the vehicle forward direction of a fuel tank 74.

Incidentally, as shown in FIG. 7, a rear shock absorber shaft 75 is conformable to the shape of the rear bent portion of the upper longitudinal frame section 56. Thereupon, the load of the rear shock absorber 73, which is applied to in an orientation of the rear shock absorber shaft 75, is smoothly transmitted to and bore by the upper longitudinal frame section 56.

Moreover, the upper portions (the first support bracket 53) of the front pipe portions 57L, 57R are bending-formed in such a manner that upper regions thereof are positioned behind lower regions thereof, so that the load of the front shock absorber 41 which is applied from the front shock-attaching portion 61 is smoothly transmitted to and bore by the upper longitudinal frame section 56.

Next, the arrangement of the auxiliary components and the electrical components which are carried on the upper longitudinal frame section 56 will be explained in detail.

Figure 11:
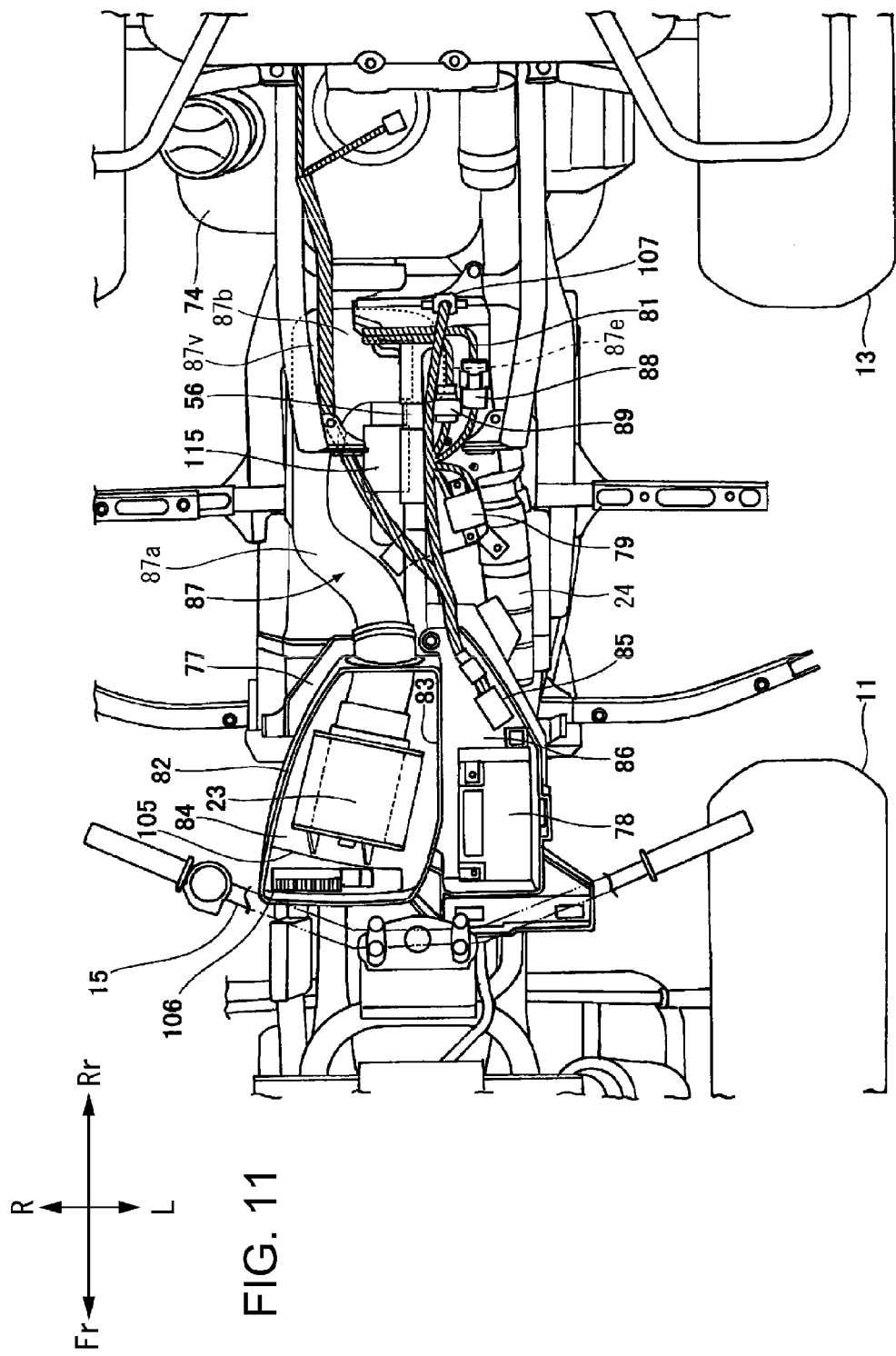
FIG. 11 is a plane layout diagram illustrating the arrangement of an intake system, an exhaust system, an auxiliary component-supporting portion, and an electric equipment supporting portion.

As shown in FIG. 11, the plate-shaped auxiliary component-supporting portion 77 is carried on the upper longitudinal frame section 56 behind the steering handlebar 15, and a combined air cleaner and battery storage box 82 is carried on the auxiliary component-supporting portion 77. This air cleaner and battery storage box 82 is narrowed down in a modified and truncated triangular shape, and is oriented in such a manner that a vehicle rearward side thereof is narrowed toward the vehicle rearward direction. It is narrowed down in the modified truncated triangular shape, to thereby provide a foot rest space for the rider.

Moreover, the air cleaner and battery storage box 82 is partitioned into left and right sections by a partition wall 83 which extends in the vehicle body longitudinal direction. The right section serves as an air cleaner storage portion 84 to store the air cleaner element 23, and the left section serves as an electric equipment storage portion 86 to store the battery 78 and a small electric component 85 arranged behind the battery 78. Namely, the air cleaner storage portion 84 and the battery 78 are separated to the left and right relative to the upper longitudinal frame section 56, and a good weight balance is maintained.

The air cleaner and battery storage box 82 is a single integral box but is partitioned as described, whereby it is configured as a multiple functional box to store the air cleaner element 23, the battery 78, and the small electric component 85.

Moreover, the plate-shaped electric-equipment-supporting portion 81 is carried on the rear portion of the single upper longitudinal frame section 56. An ignition coil 79, an alternating current generator (ACG) couple 88, a change switch coupler 89, a bank angle sensor 107, etc. are carried on the electric-equipment-supporting portion 81.

Figure 15:
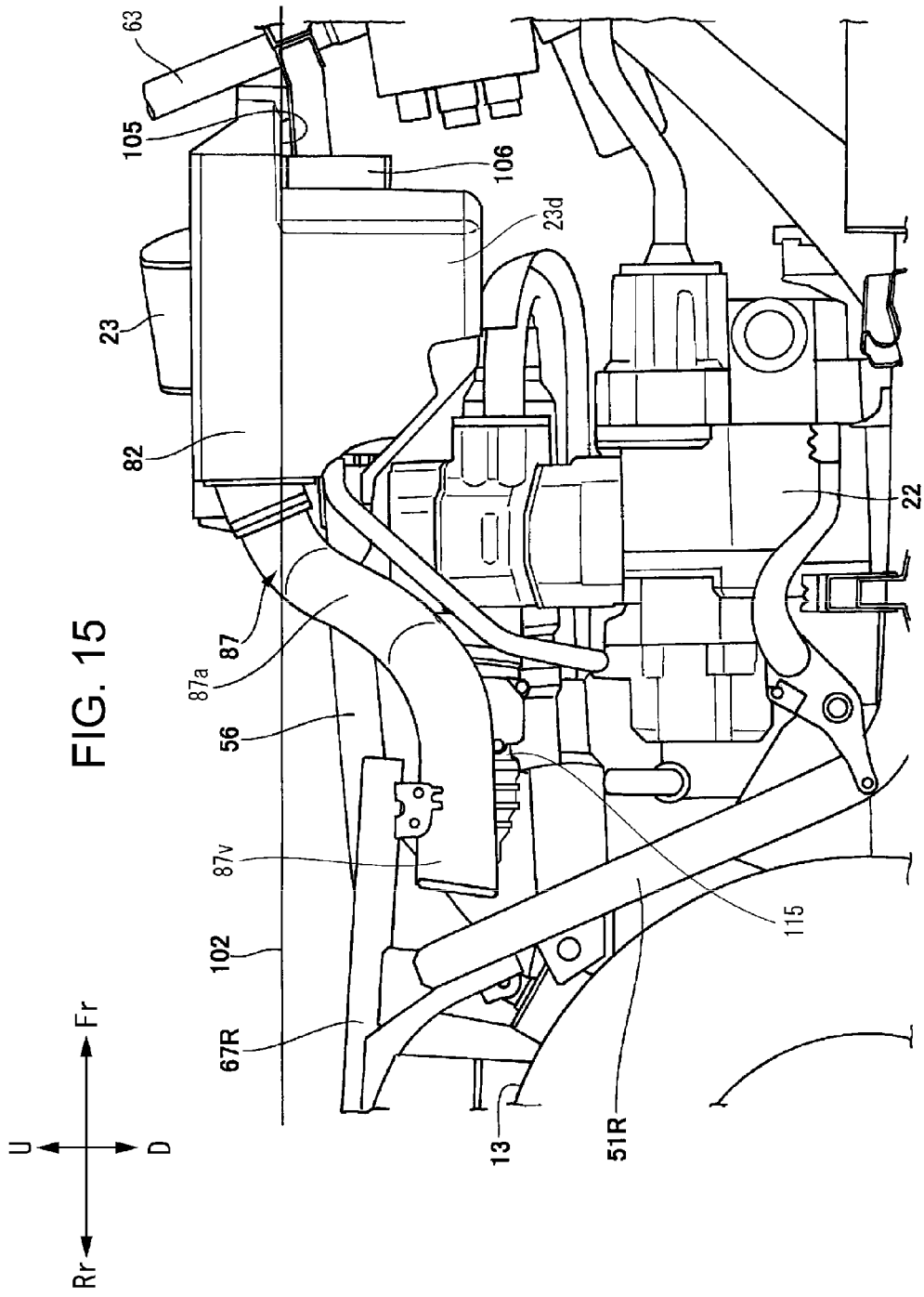
FIG. 15 is a right side view of the vehicle front portion.

As shown in FIG. 15, a main harness 91 passes under the electric equipment storage portion 86, and extends in the vehicle body longitudinal direction.

The battery 78 is arranged in the electric equipment storage portion 86, and the small electric component 85 is arranged behind the battery 78.

The small electric component includes, for example, an EPS fuse 92, a main fuse box 93 arranged behind the EPS fuse 92, a starter magnet switch 94 arranged on the right side of the main fuse box 93 in the vehicle width direction, and a fuel pump relay 95 arranged at a vehicle rearward side of the main fuse box 93.

An inlet port 105 is provided at the front portion of the air cleaner storage portion 84 of the air cleaner and battery storage box 82. A regulator 106 is arranged below this inlet port 105. Heat radiating fins 106a of the regulator 106 are provided in a vertically extending manner. Since a longitudinal direction of the heat radiating fin 106a coincides with an intake air flow direction, it is possible to reduce intake air resistance and improve heat radiating efficiency.

Moreover, the air cleaner and battery storage box 82 is fasten-fixed to the upper longitudinal frame section 56 by the lower portion and the rear end portion 82a of the battery 78.

Moreover, a plus terminal 98 of the battery 78, the EPS fuse 92, and the starter magnet switch 94 are associated with one another by a harness 91b, and a harness 91c which extends in the vehicle longitudinal direction is connected to a minus terminal 99 of the battery 78.

Next, the form of the air cleaner and battery storage box 82 will be explained with reference to the left side view and the right side view.

Figure 13:
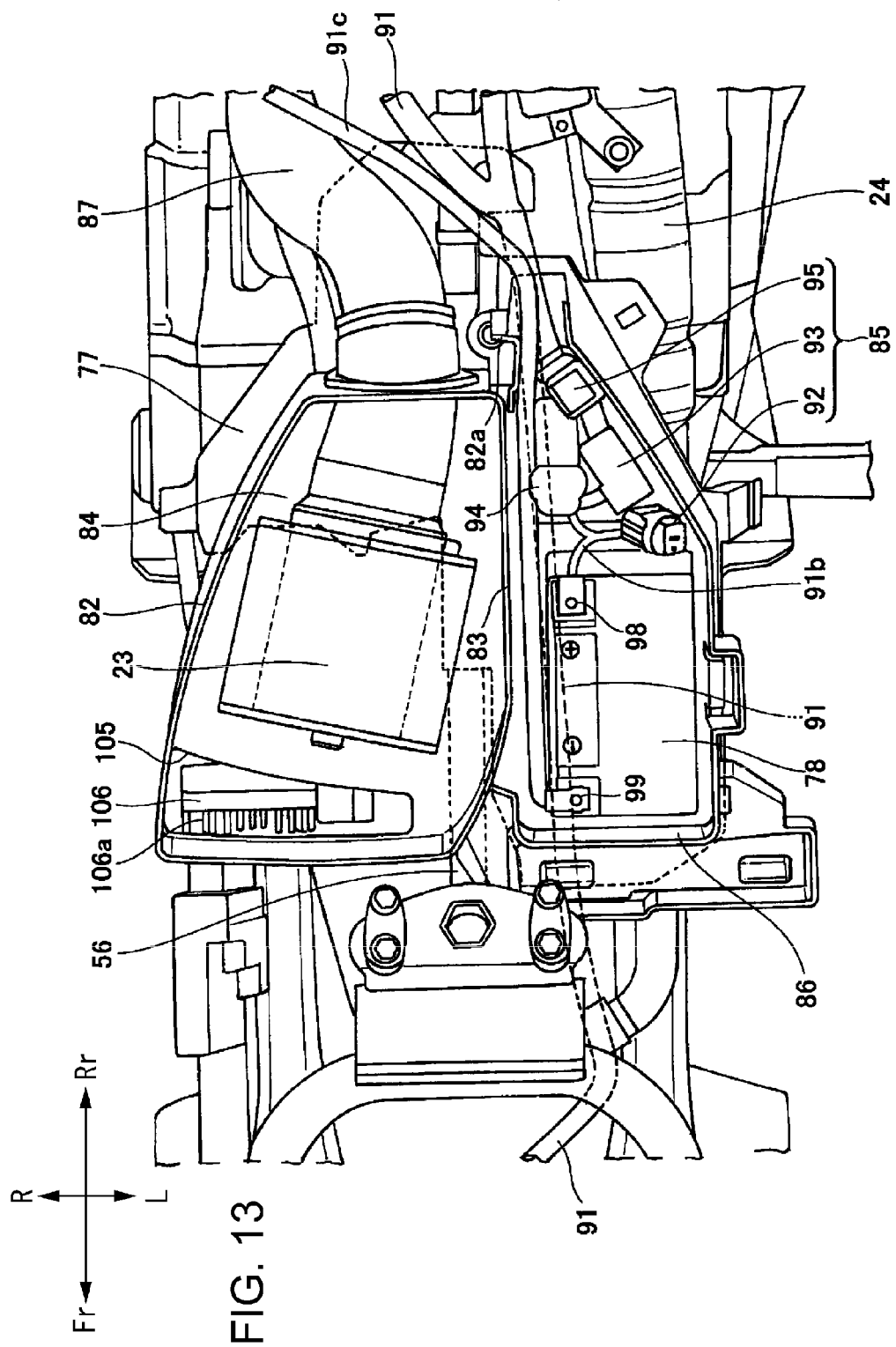
FIG. 13 is an explanatory view of the auxiliary component-supporting portion.
Figure 16:
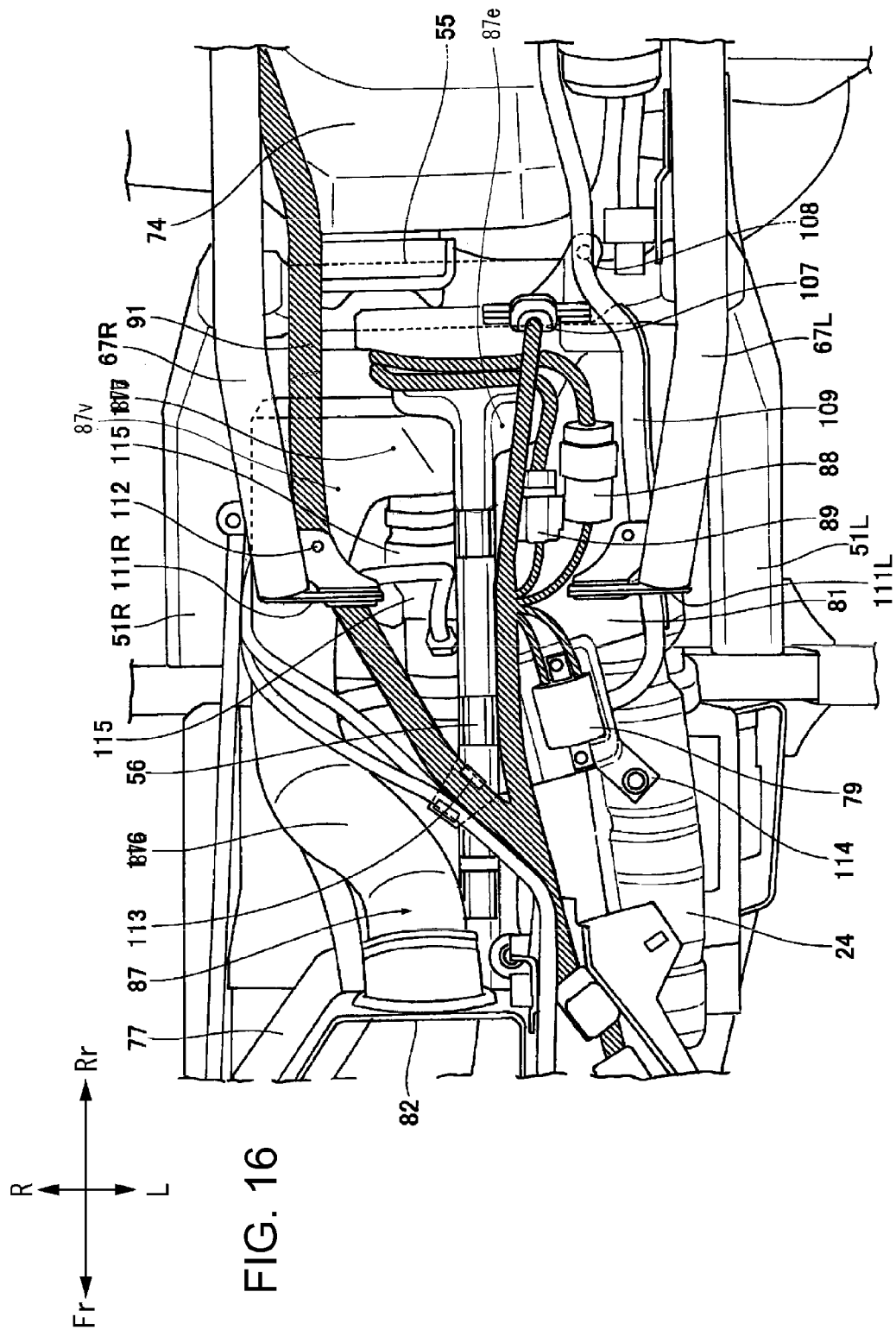
FIG. 16 is an enlarged plane layout diagram illustrating the arrangement of the intake system, the exhaust system, the auxiliary component-supporting portion, and the electric equipment supporting portion.

As shown in FIGS. 11, 13 and 16, the plate-shaped auxiliary component-supporting portion 77 is carried on the upper longitudinal frame section 56, and the air cleaner and battery storage box 82 is carried on the auxiliary component-supporting portion 77.

Figure 14:
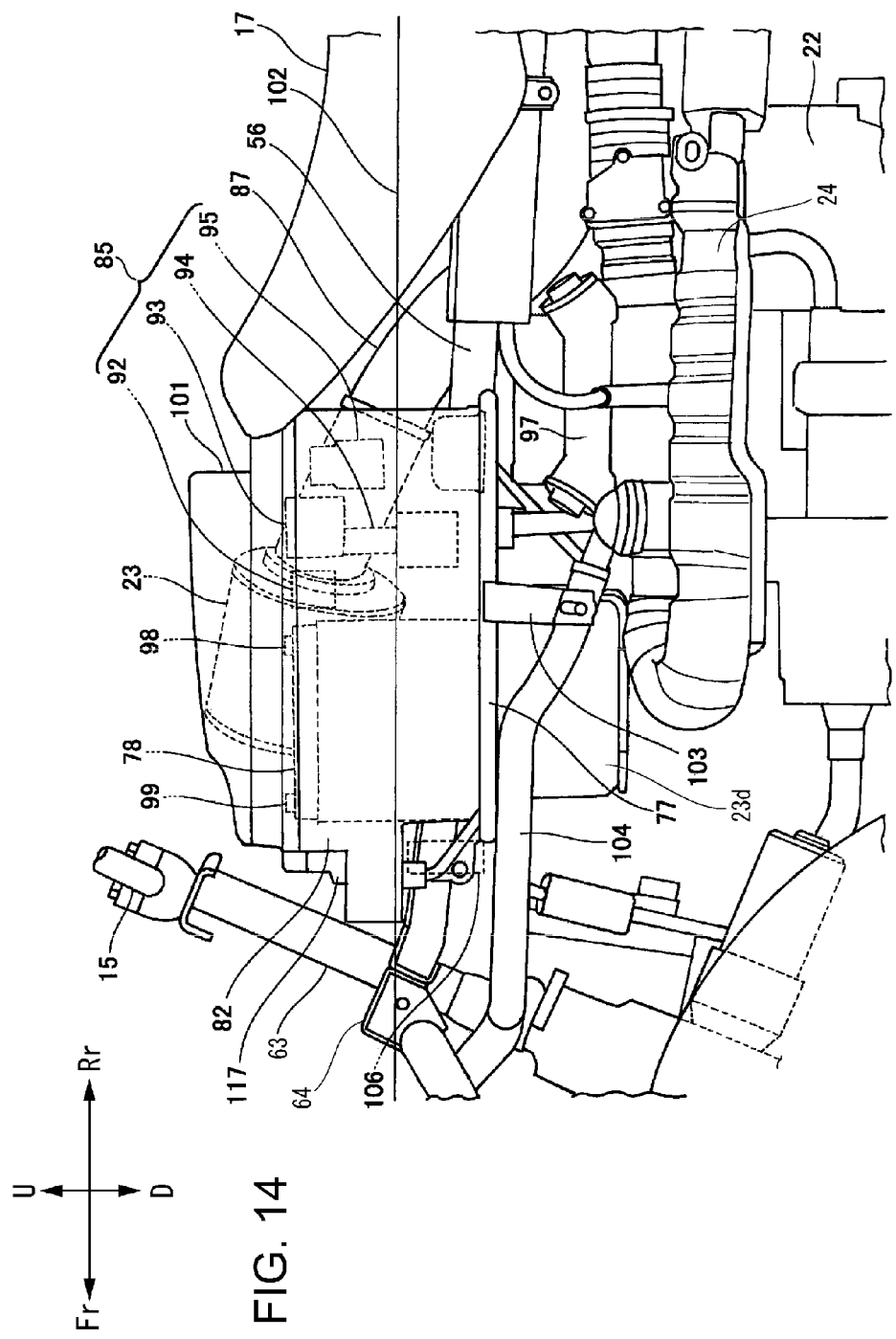
FIG. 14 is a left side view of a vehicle front portion.

The battery 78 together with the air cleaner element 23 is stored in the air cleaner and battery storage box 82, but the battery 78 is arranged behind the steering shaft 63, in the forward direction relative to the seat 17, in the forward direction relative to a cylinder 97 of the internal combustion engine 22, and on the left side of the air cleaner element 23 in the vehicle width direction (this side in FIG. 14).

The plus terminal 98 and the minus terminal 99 of the battery 78 are arranged at the upper portion of the air cleaner and battery storage box 82, namely, in the neighborhood of a lid 101.

Moreover, the small electric component 85 is arranged in the air cleaner and battery storage box 82. Namely, the small electric component 85 includes the EPS fuse 92, the main fuse box 93 arranged behind the EPS fuse 92, the starter magnet switch 94 arranged below the main fuse box 93, and the fuel pump relay 95 arranged behind the main fuse box 93.

A flood upper limit line 102 is set at a position in the neighborhood of a middle portion between the lower end of the lid 101 and the auxiliary component-supporting portion 77 below the lower end of the lid. Incidentally, the flood upper limit line 102 is set at the lower end of the inlet port 105 (refer to FIGS. 14 and 15).

The plus terminal 98 and the minus terminal 99 of the battery 78 and most of the small electric component 85 are arranged above the flood upper limit line 102, whereby waterproofing can be enhanced, and the electrical components including the battery 78 can be composed of non-waterproof components.

Moreover, a hose stay 103 is extended downward from the auxiliary component-supporting portion 77 and a radiator hose 104 is supported by the hose stay 103. Moreover, an ECU 117 (refer to FIG. 6) is arranged at the air cleaner and battery storage box 82.

In many conventional vehicles, since the battery is arranged under the seat 17 and a distance between the neighborhood of the engine circumferences at which, particularly, electrical components such as a sensor, etc. are easy to be collectively arranged, and the battery is increased, harnesses are likely to be lengthened. However, in this embodiment, since the battery 78 is arranged in the neighborhood of the internal combustion engine 22, the harnesses can be shortened. Moreover, the small electric component 85 can be also arranged in the neighborhood of the internal combustion engine 22, and as a result, the harnesses leading to the small electric component 85 can be shortened.

Moreover, in this embodiment, since the battery 78 is also stored in the case (air cleaner and battery storage box 82) which stores the air cleaner element 23, a separate battery storage case can be omitted. Moreover, since the battery 78 and the air cleaner element 23 are arranged forward relative to the cylinder of the internal combustion engine 22, they can be hard to be affected by the heat in the internal combustion engine 22.

Figure 17:
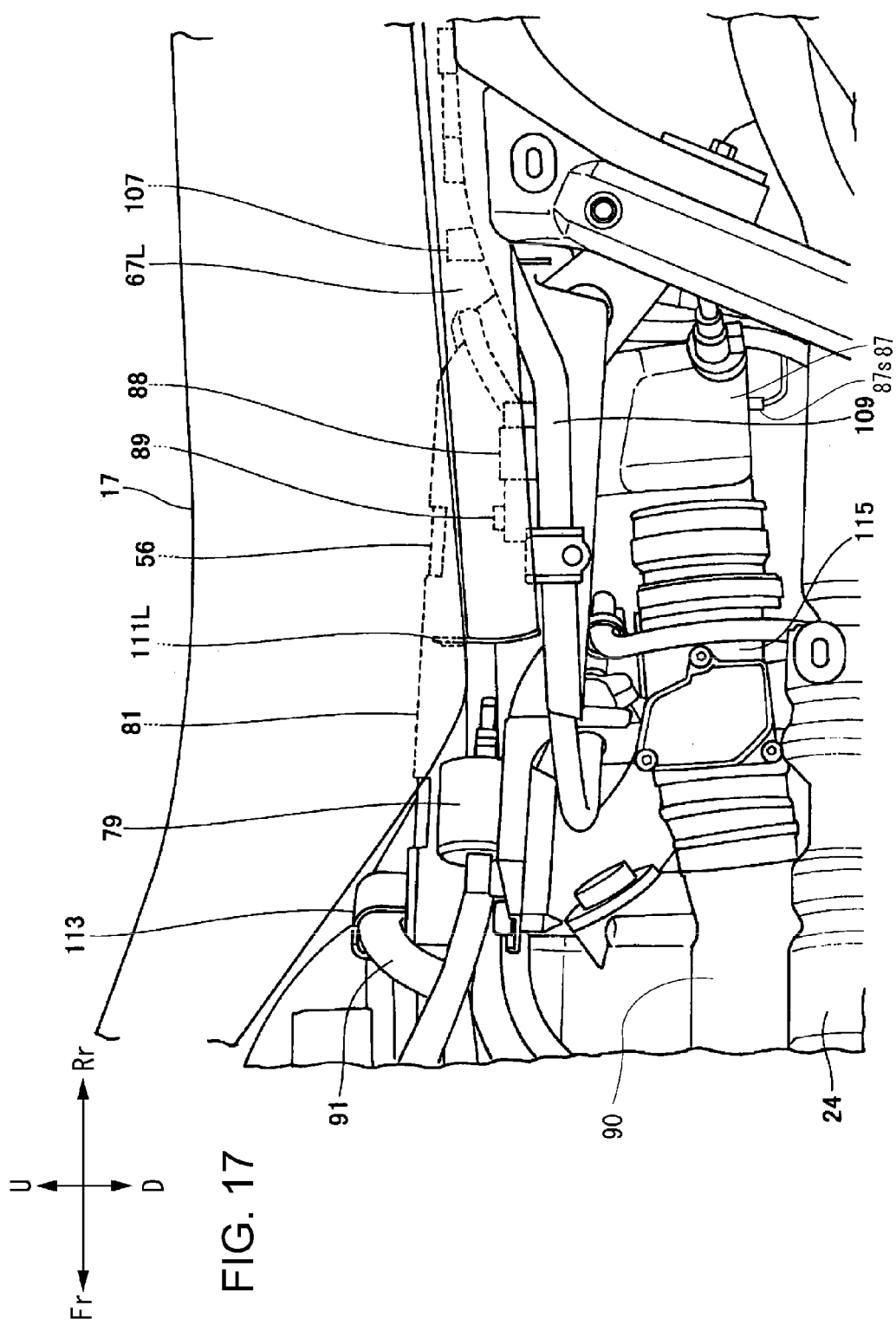
FIG. 17 is a left side view of a vehicle middle portion.

As shown in FIG. 15, the air cleaner and battery storage box 82 is provided with the intake port 105 at the vehicle forward side thereof (right side in FIG. 17). The regulator 106 is arranged below the intake port 105. Intake air is struck directly against the regulator 106, to thereby exhibit a cooling effect.

The regulator 106 is fasten-fixed to a boss that is provided on a front wall surface of the air cleaner and battery storage box 82.

Next, the arrangement of the small electric component 85 will be supplementarily explained.

As shown in FIG. 16, the electrical component support member 81 is carried on the upper longitudinal frame section 56 which is positioned at the center in the left/right direction of the vehicle body. The ignition coil 79, the ACG coupler 88, the change switch coupler 89, the bank angle sensor 107, etc. are carried on the plate-shaped electric-equipment-supporting portion 81.

Incidentally, the rear portion of the plate-shaped electric-equipment-supporting portion 81 is supported by the stay 108 of the fuel tank 74. A fuel hose 109 which extends from the fuel tank 74 is supported by a guide portion provided at a left edge of the electrical component support member 81, and extends in the vehicle forward direction.

The fuel hose 109 is supported by the electrical component support member 81. If the supported region is the left side in the vehicle width direction relative to the upper longitudinal frame section 56, the main harness 91 is arranged at the right side in the vehicle width direction. The fuel hose 109 and the main harness 91 are arranged at the left and right relative to the upper longitudinal frame section 56, with good balance.

Moreover, seat catchers 111L, 111R are provided at the front ends of the rear pipes 67L, 67R. The main harness 91 is supported on the right seat catcher 111R by a clip 112. Moreover, the main harness 91 is supported, through a stay 113, on the electrical component support member 81 at a position in the neighborhood of the ignition coil 79. The stay 113 is obliquely provided by rotating it in a counterclockwise direction relative to a vehicle body longitudinal axis in such a manner that the main harness 91 faces the right rear pipe 67R. Consequently, it is possible to smoothly displace the thick main harness 91 in the vehicle width direction.

Moreover, the fuel tank 74 is arranged behind the electric equipment supporting 81 in the vehicle rearward direction. It is possible to wire the harness at a position separated from the fuel tank 74, and workability is enhanced.

Moreover, the rear portion of the electrical component support member 81 spreads in the vehicle width direction so as to cover a joined portion between the second support bracket 55 and the rear portion of the upper longitudinal frame section 56, and so as to extend along the second support bracket 55.

In this embodiment, on this spreading region, a harness extending from the rear surface of the AGC coupler 88, and a harness extending from the rear surface of the change switch coupler 89 are carried. The joined region between the second support bracket 55 and the rear portion of the upper longitudinal frame section 56 is subjected to welding, whereby burrs and projections are easy to be produced. However, when the joined region is covered with the rear portion of the electrical component support member 81, there is no fear that the harnesses, the electrical components, etc. are damaged by the burrs and the projections.

Moreover, the plate-shaped electric-equipment-supporting portion 81 is extended in the vehicle forward direction relative to the rear pipe 67L, and the main harness 91 is supported by the front end of the rear pipe 67R and the front end of the electrical component support member 81. If the main harness 91 is intended to be wired outward of the vehicle width from the center in the vehicle width direction while being bent in a crank-shape, not only a harness length is lengthen but also the main harness is hard to be bent since the main harness is a relatively thick harness, and assembly is poor. However, in this embodiment, the above-mentioned structure ensures a good assembly while allowing the main harness 91 to be firmly supported.

Moreover, a cover stay portion 114 to which the vehicle body cover is attached is provided at a left region of the front portion of the electrical component support member 81.

Namely, the electrical component support member 81 also performs the role in supporting the vehicle body cover.

Moreover, as shown in FIG. 6, the electrical component support member 81 is configured so as to be supported directly by the upper longitudinal frame section 56 and, at the same time, is provided with a step portion which is formed at a position lower than the upper end of the upper longitudinal frame section 56. The electrical components such as the ignition coil 79, etc. are adapted to be stored on this step.

Moreover, as shown in FIG. 16, the main intake duct 87 and the throttle body 115 are arranged at one side (in this example, the right side in the vehicle width direction) relative to the upper longitudinal frame section 56, and the electrical component support member 81 is arranged at the other side (in this example, the left side in the vehicle width direction), so that the available use of spaces can be realized and, at the same time, the maintainability of the throttle body 115 can be enhanced since the throttle body 115 is not obstructed by the electrical component support member 81.

Moreover, the exhaust pipe 24 is arranged below the plate-shaped electric-equipment-supporting portion 81. Since the electrical component support member 81 performs the role of a heat insulator, the ignition coil 79, the ACG coupler 88, and the change switch coupler 89 are thermally protected.

As shown in FIG. 17, the seat catcher 111L is provided at the front end of the rear pipe 67L and the seat 17 is supported by the seat catcher 111L.

Moreover, since the ignition coil 79, the ACG coupler 88, and the change switch coupler 89 are arranged lower than the upper surface of the upper longitudinal frame section 65, there is no fear that they are subjected to downward applying load of the seat 17.

Moreover, since the ACG coupler 88, the change switch coupler 89, the bank angle sensor 107, and the fuel hose 109 are arranged at positions at which they are overlapped on the rear pipe 67L, the fear that the downward applying load of the seat 17 is applied to them is more reduced and, in addition, the protecting effect of these electrical components can be enhanced. Moreover, the electrical component support member 81 is effectively provided in a narrow space below the seat and the electrical components can be arranged in the space.

Moreover, the main harness 91 is supported at the front portion of the electrical component support member 81 by the stay 113. The throttle body 115 is arranged below the electrical component support member 81, and the exhaust pipe 24 is arranged below the throttle body 115.

The main intake duct 87 of the illustrative embodiment, and its surrounding structures will now be explained in greater detail.

As shown in FIG. 11, the main intake duct 87 is extended from the air cleaner element 23 to the right side of the single upper longitudinal frame section 56 in the vehicle width direction, the upper longitudinal frame section 56 being arranged at a central portion of the vehicle body frame in the vehicle width direction.

Figure 18:
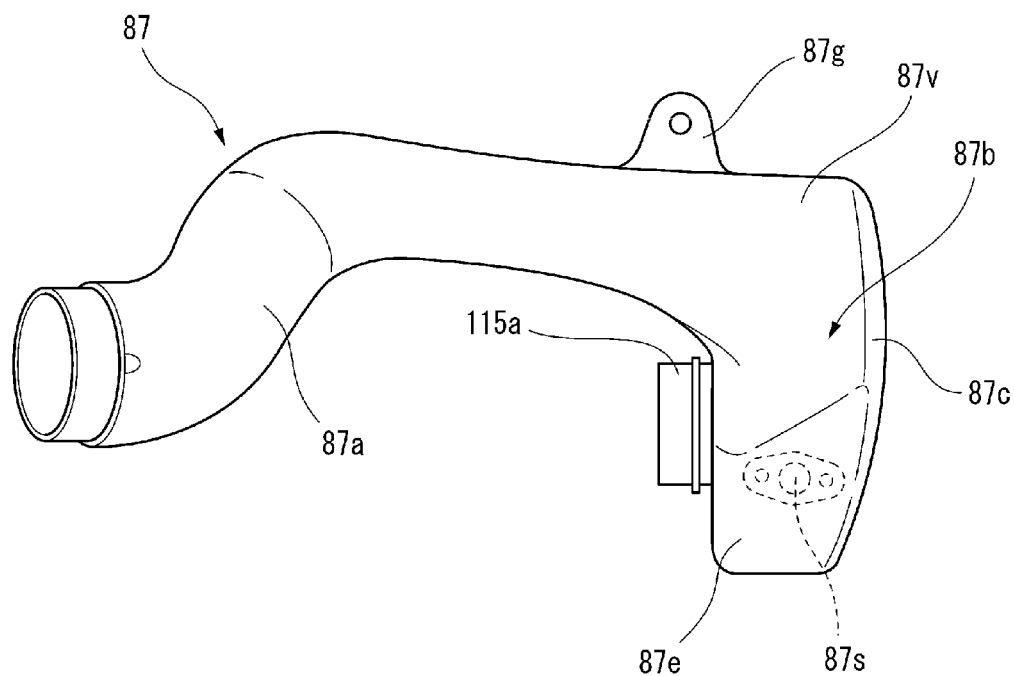
FIG. 18 is a top plan view illustrating a single component state in which the intake passage employed in this embodiment is removed.
Figure 19:
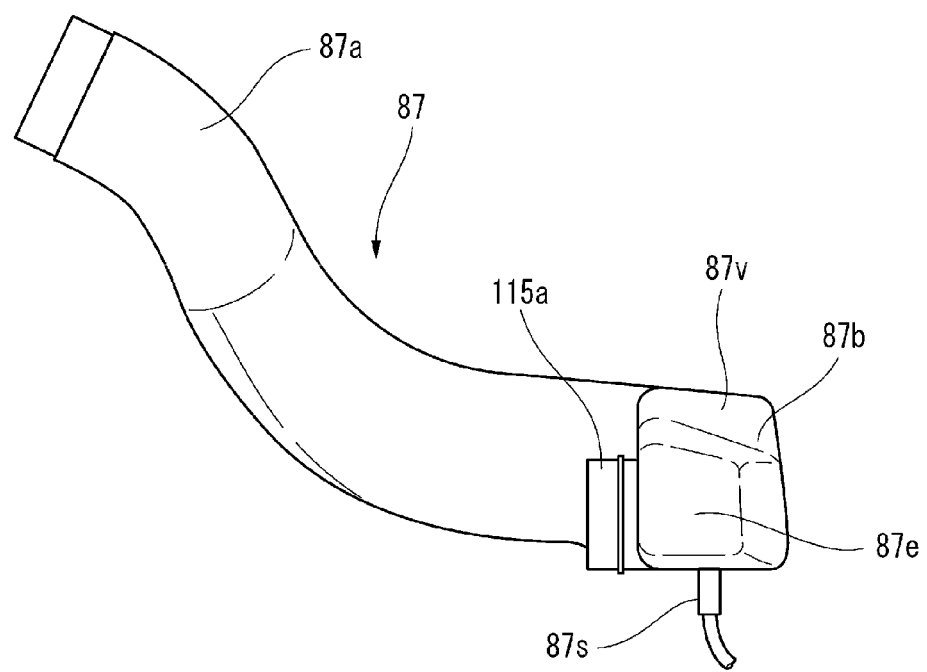
FIG. 19 is a side view illustrating the single component state in which the intake passage employed in this embodiment is removed.

Incidentally, FIGS. 18 and 19 show a state where the main intake duct 87 is removed from the vehicle 10.

The air cleaner element 23 is provided on the upper longitudinal frame section 56 in front of the seat 17. The main intake duct 87 includes a first extending portion 87a arranged so as to extend from an outlet of the air cleaner element 23 downwardly in the vehicle body rearward direction, and to pass laterally of the throttle body 115, with a curved portion 87v passing under the upper longitudinal frame section 56 and curved toward inward of the vehicle body at the rear end of the first extending portion 87a.

The main intake duct 87 also includes a second extending portion 87b, connected to the throttle body 115 from the rearward direction so as to be wound around toward the rear portion of the throttle body 115. Namely, the main intake duct 87 is configured to exhibit a substantially J-shape as viewed in top plan view, and extends around so as to substantially surround the throttle body 115.

Incidentally, the main intake duct 87 is attached at an upward end side thereof to the air cleaner element 23, and attached at a lower end side thereof to the throttle body 115, but is suitably fixed through an attaching portion 87g which is protrudingly provided at a region of the main intake duct 87 which approaches the curved portion 87v from the first extending portion 87a.

As shown in FIGS. 14 and 15 (also refer to FIG. 16), the air cleaner element 23 is arranged at a high position of the top surface of the vehicle 10 in the forward direction of vehicle 10. However, the main intake duct 87 is arranged so as to be wound around toward the right side of the throttle body 115, so that a space for the main intake duct 87 is not required between the throttle body 115 and the upper longitudinal frame section 56. As a result, space in a vehicle body height direction can be reduced. Consequently, the position of the seat 17 arranged on the upper longitudinal frame section 56 can be made low. Moreover, the position of center of gravity of the vehicle can be made low.

Moreover, in this embodiment, the first extending portion 87a of the main intake duct 87 is configured such that a side thereof in the vehicle body rearward direction has a cross-sectional area of an air flow path which is larger than that of a side thereof in the vehicle body forward direction. The first extending portion 87a is configured such that the cross-sectional area of the air flow path gradually becomes increased toward the curved portion 87v in this way, so that it is possible to reduce air resistance involved in the flow path curve of the first extending portion 87a (downward and right directional curve).

Moreover, the curved portion 87v of the main intake duct 87, which is largely curved at about 90° toward the center side of the vehicle body, and the second extending portion 87b which follows a curved rear flow path, are configured such that they have cross-sectional areas of air flow paths which are larger than that of the first extending portion 87a.

Namely, the cross-sectional area of the air flow path sharply curved from the first extending portion 87a toward the second extending portion 87b is increased more than that of an upstream side, so that it is possible to reduce the air resistance involved in the sharp curve and an air stream is allowed to be smoothly flow.

Therefore, the main intake duct 87 is allowed to be sharply curved rearward from the side of the throttle body 115, and the inside space of the vehicle is configured so as to be capable of being skillfully used regardless of the positions of the air cleaner element 23 and the throttle body 115.

Figure 12:
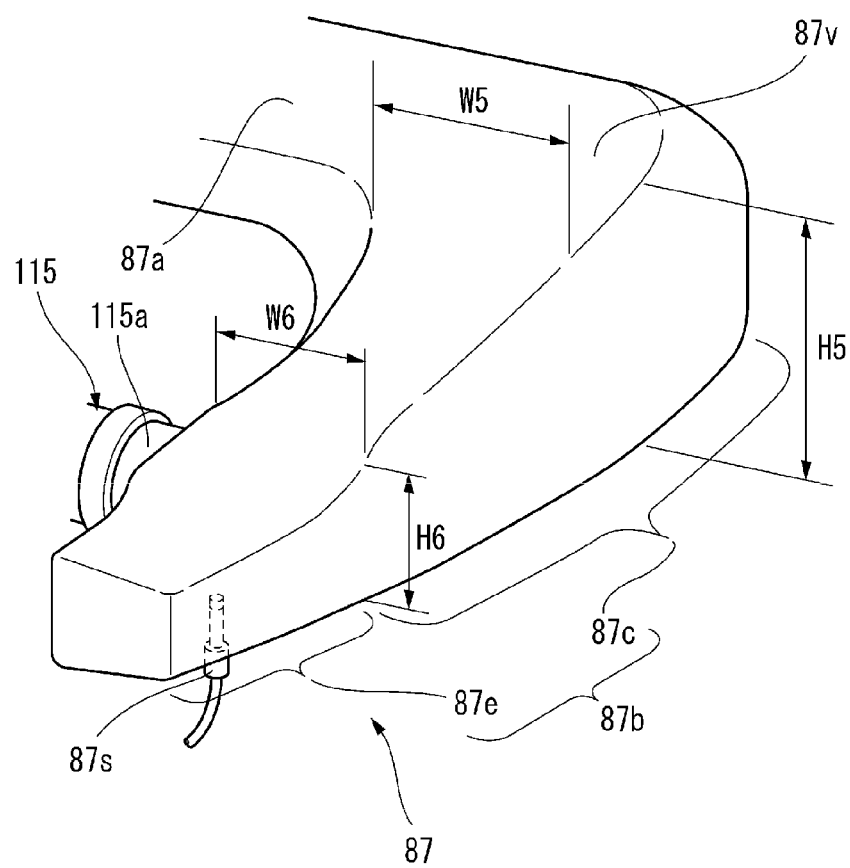
FIG. 12 is an essential portion perspective view showing a connected portion between an intake passage and a throttle body, and its neighborhood.

Moreover, in this embodiment, as shown in FIG. 12 (also refer to FIGS. 11 and 16), the second extending portion 87b of the main intake duct 87 is provided with a gradually narrowed region 87c in which a cross-sectional area of an air flow path thereof becomes gradually reduced toward a downstream of the flow path. Namely, the gradually narrowed region 87c is configured such that its height H6 and width W6 in the neighborhood of a connection portion 115a of the throttle body 115 become gradually smaller than its height H5 and width W5 in the neighborhood of the curved portion 87v on the upstream side. According to this structure, an air density which is decreased by increasing the cross-sectional area in order to allow the meandering structure of the main intake duct 87 can be increased toward the throttle body 115.

In this embodiment, as shown in FIG. 12 (also refer to FIG. 16), the second extending portion 87b is provided with a bulged portion 87e which is bulged on the side opposite to the air inflow side relative to the connection portion 115a with respect to the throttle body 115. An intake temperature sensor 87s is provided at the bulged portion 87e.

In this way, the intake temperature sensor 87s is attached to a position at which the influence of the intake flow is reduced (a position against which the intake flow is not struck directly), whereby the temperature of the intake air can be accurately measured.

In this embodiment, as shown in FIGS. 14 and 15, the air cleaner element 23 has a downwardly bulged portion 23d at a position which is more forward than the cylinder 97 of the internal combustion engine 22 in the vehicle forward direction and at which it is overlapped on the upper longitudinal frame section 56 when viewed in the side view, and attached to the position. As discussed above, the first extending portion 87a of the main intake duct 87 passes laterally of the upper longitudinal frame section 56, and the second extending portion 87b is connected to the throttle body 115 so as to pass under the upper longitudinal frame section 56.

Moreover, a connecting tube 90 (refer to FIG. 17) is provided extending between the throttle body 115 and the cylinder 97.

The downwardly bulged portion 23d is provided at the position at which the space inside the vehicle body is relatively easy to be taken on the forward side of the vehicle 10, so that it is possible to compactly arrange the air cleaner element 23 while ensuring the intake capacity of the air cleaner element 23 and, in addition, it is possible to set the position of the seat 17 arranged on the upper longitudinal frame section 56, so as to lower the position.

Moreover, in this embodiment, the intake system including the air cleaner element 23 and the main intake duct 87, and the exhaust system are arranged on the left and right sides of the vehicle body frame with the upper longitudinal frame section 56 interposed therebetween, whereby heat of the exhaust pipe can be substantially shielded from being transmitted to the intake system, so that it is possible to compactly configure the vehicle body without a need to leave a useless space.

The vehicle of the present invention is not limited to the structure of the above-mentioned embodiment and various changes can be made to the embodiment. While the cross-sectional shape of the intake passage on the downstream side is, for example, a substantially rectangular shape in this embodiment, it is possible to set it in such a manner that it becomes a different cross-sectional shape, taking circumferential equipment into consideration.

In addition, while the structure of the intake passage according to the present invention hereof is suitable for a small-sized vehicle, particularly, an all-terrain vehicle, of course, it may be also applied to a general vehicle.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle comprising:
   a vehicle body frame;
   a plurality of wheels attached to the vehicle body frame;
   an internal combustion engine comprising a crankcase and a cylinder which extends upwardly from the crankcase proximate a central portion of the vehicle body frame;
   an exhaust pipe connected to a forward portion of the cylinder of the internal combustion engine;
   a main intake duct connected, via a throttle body, to a rearward portion of the cylinder;
   an air cleaner case which is operatively attached to the vehicle body frame, and an air cleaner element disposed in the air cleaner case;
   a transmission for transmitting torque output from the engine to the wheels; and
   a seat provided on the vehicle body frame,
   wherein the air cleaner case is provided on the vehicle body frame in front of the seat, and
   wherein the intake duct comprises:
      a first extending portion arranged to extend rearwardly from an outlet of the air cleaner element and to pass laterally of the throttle body;
      a curved portion curved inward of the vehicle body frame at a rear end of the first extending portion; and
      a second extending portion connected to a rear portion of the throttle body and configured to be wound around a portion of the throttle body.

2. The vehicle according to claim 1, wherein the first extending portion is configured such that a side thereof in a vehicle body rearward direction has a cross-sectional area of an air flow path which is larger than that of a side thereof in a vehicle body forward direction.

3. The vehicle according to claim 1, wherein the curved portion and the second extending portion are configured such that they have cross-sectional areas of air flow paths which are larger than the first extending portion.

4. The vehicle according to claim 1, wherein the second extending portion is provided with a gradually narrowed region in which a cross-sectional area of an air flow path is gradually reduced toward a downstream of the flow path.

5. The vehicle according to claim 3, wherein the second extending portion is provided with a gradually narrowed region in which a cross-sectional area of an air flow path is gradually reduced toward a downstream of the flow path.

6. The vehicle according to claim 1, wherein the second extending portion is provided with a bulged portion which is bulged on a side opposite to an air inflow side relative to a connection portion with respect to the throttle body, and further comprising an intake temperature sensor provided at the bulged portion.

7. The vehicle according to claim 1, wherein:
an upper longitudinal frame section which extends in a forward/rearward direction is provided at an upper central portion of the vehicle body frame in a vehicle width direction;
the air cleaner case has a downwardly bulged portion at a position forward of the cylinder of the internal combustion engine and overlapped with the upper longitudinal frame section when viewed in a side view;
the first extending portion passes laterally of the upper longitudinal frame section, and
the second extending portion passes under the upper longitudinal frame section.

8. The vehicle according to claim 1, wherein the exhaust pipe is arranged on a side opposite to the first extending portion with the upper longitudinal frame section interposed therebetween.

9. The vehicle according to claim 1, wherein the vehicle body frame comprises a main lower frame portion and an upper longitudinal frame section removably attached to said main lower frame portion, and wherein said upper longitudinal frame section has an auxiliary component-supporting portion and an electrical component support member thereon.

10. The vehicle according to claim 1, wherein the air cleaner case has a longitudinally extending partition formed therein dividing an interior thereof into two compartments, wherein one of said compartments houses the air cleaner element, and wherein the other of said compartments is provided for housing a battery.

11. The air intake system of claim 1, wherein the air cleaner case has a tapered shape as viewed in top plan view thereof, including a wide front portion and a narrow rear portion.

12. An air intake system for a vehicle, said air intake system comprising:
an air cleaner case;
an air cleaner element disposed in said air cleaner case;
a main intake duct for placement extending between the air cleaner element and a throttle body, wherein the main intake duct comprises:
a first extending portion arranged to extend rearwardly from an outlet of the air cleaner element and to pass laterally of the throttle body;
a curved portion curved at an approximately 90 degree angle at a rear end of the first extending portion; and
a second extending portion connected to a rear portion of the throttle body and configured to be wound around a portion of the throttle body.

13. The air intake system for a vehicle according to claim 12, wherein the first extending portion is configured such that a rear portion thereof has a cross-sectional area of an air flow path which is larger than that of a front portion thereof.

14. The air intake system for a vehicle according to claim 12, wherein the curved portion and the second extending portion are configured such that they have cross-sectional areas of air flow paths which are larger than the first extending portion.

15. The air intake system for a vehicle according to claim 12, wherein the second extending portion is provided with a gradually narrowed region in which a cross-sectional area of an air flow path is gradually reduced toward a downstream of the flow path.

16. The air intake system for a vehicle according to claim 13, wherein the second extending portion is provided with a gradually narrowed region in which a cross-sectional area of an air flow path is gradually reduced toward a downstream of the flow path.

17. The air intake system for a vehicle according to claim 12, wherein the second extending portion is provided with a bulged portion which is bulged on a side opposite to an air inflow side relative to a connection portion with respect to the throttle body, and further comprising an intake temperature sensor provided at the bulged portion.

18. The air intake system for a vehicle according to claim 12, wherein the air cleaner case has a longitudinally extending partition formed therein dividing an interior thereof into two compartments, wherein one of said compartments houses the air cleaner element, and wherein the other of said compartments is provided for housing a battery.

19. The air intake system of claim 12, wherein the air cleaner case has a tapered shape as viewed in top plan view thereof, including a wide front portion and a narrow rear portion.

* * * * *